(12) United States Patent
Watano et al.

(10) Patent No.: US 12,248,074 B2
(45) Date of Patent: Mar. 11, 2025

(54) LiDAR SENSOR UNIT AND VEHICLE SECURITY SYSTEM

(71) Applicant: KOITO MANUFACTURING CO., LTD., Tokyo (JP)

(72) Inventors: Yuichi Watano, Shizuoka (JP); Shunsuke Okamura, Shizuoka (JP); Yoshiaki Fushimi, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 915 days.

(21) Appl. No.: 17/422,068

(22) PCT Filed: Dec. 20, 2019

(86) PCT No.: PCT/JP2019/050166
§ 371 (c)(1),
(2) Date: Jul. 9, 2021

(87) PCT Pub. No.: WO2020/145097
PCT Pub. Date: Jul. 16, 2020

(65) Prior Publication Data
US 2022/0113427 A1    Apr. 14, 2022

(30) Foreign Application Priority Data

Jan. 10, 2019 (JP) ................... 2019-002788
Jan. 10, 2019 (JP) ................... 2019-002789
(Continued)

(51) Int. Cl.
*G01S 17/93*      (2020.01)
*B60Q 1/00*       (2006.01)
(Continued)

(52) U.S. Cl.
CPC .......... *G01S 17/931* (2020.01); *B60Q 1/0047* (2013.01); *B60Q 1/04* (2013.01); *G01S 7/481* (2013.01)

(58) Field of Classification Search
None
See application file for complete search history.

(56) References Cited

U.S. PATENT DOCUMENTS

2013/0100114 A1    4/2013  Lynch
2018/0045826 A1    2/2018  Kasaba et al.
(Continued)

FOREIGN PATENT DOCUMENTS

JP    H05-027037 A    2/1993
JP    H05-264731 A    10/1993
(Continued)

OTHER PUBLICATIONS

International Search Report issued in International Application No. PCT/JP2019/050166, mailed Mar. 17, 2020 (12 pages).
(Continued)

*Primary Examiner* — Hovhannes Baghdasaryan
(74) *Attorney, Agent, or Firm* — Osha Bergman Watanabe & Burton LLP

(57) ABSTRACT

Provided is a LiDAR sensor unit in which even when a lens element is provided, measurement data is less likely to be affected by the lens element. A LiDAR sensor unit has: a LiDAR sensor; a lens element that is provided on an optical path of light emitted from the LiDAR sensor; and a processing unit that outputs measurement data which has been
(Continued)

measured by the LiDAR sensor and which includes the orientation and the distance of a measurement subject. The processing unit is configured to not output measurement data of a specific orientation which is the same but the distance corresponding thereto differs before and after attachment of the lens element under the same environment.

4 Claims, 24 Drawing Sheets

(30) Foreign Application Priority Data

Jan. 10, 2019 (JP) .................................. 2019-002790
Jan. 10, 2019 (JP) .................................. 2019-002791

(51) Int. Cl.
*B60Q 1/04* (2006.01)
*G01S 7/481* (2006.01)
*G01S 17/931* (2020.01)

(56) References Cited

U.S. PATENT DOCUMENTS

| | | | |
|---|---|---|---|
| 2018/0224553 A1 | 8/2018 | Kitagawa et al. | |
| 2018/0284285 A1 | 10/2018 | Curatu | |
| 2018/0334137 A1 | 11/2018 | Salter et al. | |

FOREIGN PATENT DOCUMENTS

| | | |
|---|---|---|
| JP | H07-084046 A | 3/1995 |
| JP | H08-101267 A | 4/1996 |
| JP | 2011-207444 A | 10/2011 |
| JP | 2012-237580 A | 12/2012 |
| JP | 2014-109537 A | 6/2014 |
| JP | 2014-142242 A | 8/2014 |
| JP | 2017-102840 A | 6/2017 |
| JP | 2017-202708 A | 11/2017 |
| JP | 2018-026305 A | 2/2018 |
| JP | 2018-128432 A | 8/2018 |
| WO | 2017-056776 A1 | 4/2017 |

OTHER PUBLICATIONS

Written Opinion issued in International Application No. PCT/JP2019/050166, mailed Mar. 17, 2020 (7 pages).

LiDAR SENSOR UNIT AND VEHICLE SECURITY SYSTEM

TECHNICAL FIELD

The present invention relates to a LiDAR sensor unit and a vehicle security system.

BACKGROUND ART

A LiDAR sensor for a vehicle that measures a distance to an object is known.

CITATION LIST

Patent Literature

Patent Literature 1: JP-A-2018-128432

SUMMARY OF INVENTION

Technical Problem

When a LiDAR is mounted on a vehicle, a transparent cover is provided to protect the LiDAR sensor. Alternatively, in front of a light emitting unit or a light receiving unit that emits light, a lens element is provided to increase a converging rate. When the lens element such as a cover or an inner lens is provided, light emitted from the light emitting unit is bent, and a change occurs in measurement data as compared with a state in which the lens element is not provided.

The present invention provides a LiDAR sensor unit in which, even if a lens element is provided, the lens element is less likely to affect measurement data.

Solution to Problem

A LiDAR sensor unit according to one aspect of the present invention including:
a LiDAR sensor;
a lens element that is provided on an optical path of light emitted from the LiDAR sensor; and
a processing unit configured to output measurement data including a direction and a distance that are to be measured, the measurement data being measured by the LiDAR sensor,
in which the processing unit is configured not to output the measurement data for a specific direction in which the direction is the same and distances are different before and after attachment of the lens element in the same environment.

A LiDAR sensor unit according to one aspect of the present invention including:
a LiDAR sensor that is mounted on a vehicle and is capable of outputting at least distance data to be measured; and
a processing unit configured to output, as measurement data, data including distance data acquired by the LiDAR sensor,
in which the processing unit outputs the measurement data with a distance within a predetermined fluctuation threshold value as a constant distance, the predetermined fluctuation threshold value being determined based on a maximum value and a minimum value of the distance data accumulated in a predetermined period.

A LiDAR sensor unit according to one aspect of the present invention including:
a LiDAR sensor that is mounted on a vehicle and is configured to output measurement data including a direction and a distance of an object;
a processing unit configured to process the measurement data output from the LiDAR sensor; and
an image forming unit configured to compare first measurement data acquired from the LiDAR sensor at a first time with second measurement data acquired from the LiDAR sensor at a second time after predetermined time has elapsed from the first time, and to generate an image in which the second measurement data having the same direction and a difference in distance being equal to or greater than a threshold value is represented in a mode different from that of the second measurement data having the same direction and a difference in distance being less than the threshold value.

A vehicle security system according to an aspect of the present invention including:
a LiDAR sensor that is mounted on a vehicle and is configured to acquire information of a surrounding of the vehicle; and
a control unit configured to control the LiDAR sensor,
in which the control unit is configured to acquire first measurement data in a first cycle while the vehicle is parked, and to acquire second measurement data in a second cycle shorter than the first cycle when a fluctuation greater than a predetermined value occurs in the first measurement data.

Advantageous Effects of Invention

The present invention provides a LiDAR sensor unit in which, even if a lens element is provided, the lens element is less likely to affect measurement data.

The present invention provides the LiDAR sensor unit suitable for a vehicle that can be automatically driven.

The present invention provides the LiDAR sensor unit suitable for controlling a vehicle.

The present invention provides a power saving vehicle security system using a LiDAR sensor.

DESCRIPTION OF EMBODIMENTS

Examples of embodiments will be described in detail below with reference to the accompanying drawings. In each drawing using the description hereinafter, a scale is appropriately changed in order to show each of members in a recognizable size.

First Embodiment

Figure 1:
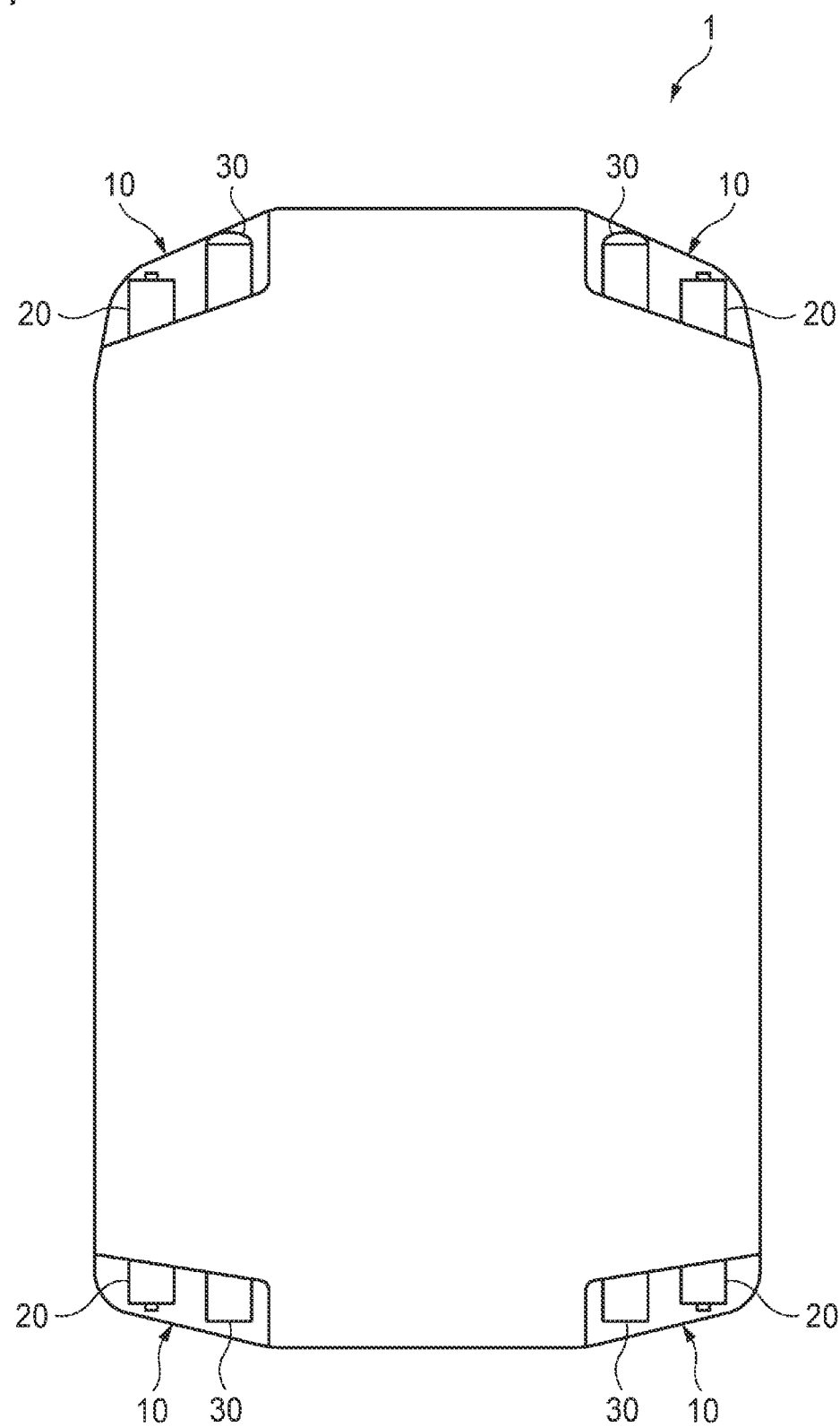
FIG. 1 is a top view showing a vehicle to which a LiDAR sensor unit is attached.

FIG. 1 is a top view showing a vehicle 1 to which a LiDAR sensor unit 10 according to a first embodiment of the present invention is attached. As shown in FIG. 1, the LiDAR sensor unit 10 is attached to a right front portion, a left front portion, a right rear portion, and a left rear portion of the vehicle 1.

Figure 2:
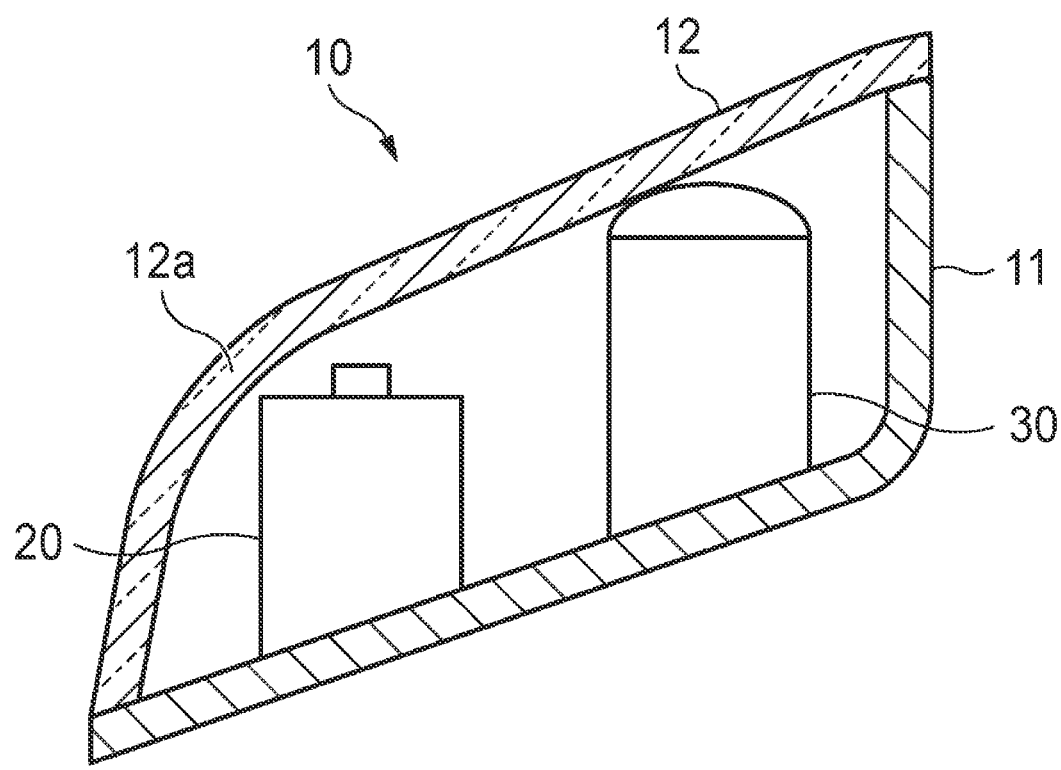
FIG. 2 is a schematic view showing a lamp unit to which the LiDAR sensor unit is attached.

FIG. 2 is a schematic view showing the LiDAR sensor unit 10 attached to the left front portion of the vehicle 1. In the present embodiment, the LiDAR sensor unit 10 is provided together with a lamp unit 30 configured to illuminate surroundings of the vehicle 1. The lamp unit 30 can be a head lamp, a rear combination lamp, a daytime running lamp, a fog lamp, a clearance lamp, or a stop lamp. The LiDAR sensor unit 10 includes a housing 11 and an outer cover 12. The lamp unit 30 and a LiDAR sensor 20 are provided inside a space formed by the housing 11 and the outer cover 12.

Figure 3:
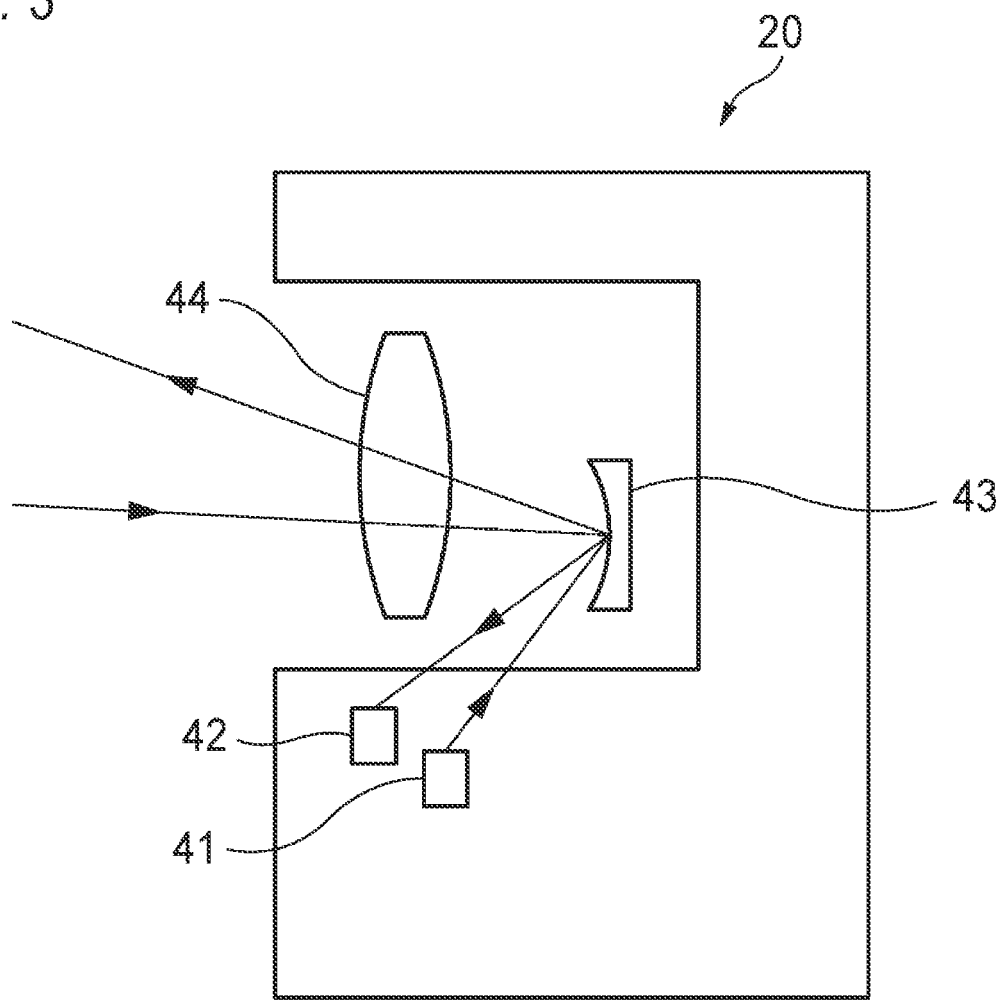
FIG. 3 is a schematic view showing a LiDAR sensor.

FIG. 3 is a schematic view showing the LiDAR sensor 20. As shown in FIG. 3, the LiDAR sensor 20 includes a light emitting unit 41, a light receiving unit 42, a MEMS mirror 43, and a converging lens 44.

Light emitted from the light emitting unit 41 is reflected by the MEMS mirror 43, and is emitted to an outside of the vehicle 1 via the converging lens 44. The light (hereinafter referred to as return light) that is emitted from the light emitting unit 41 and is reflected by an object is reflected by the MEMS mirror 43 via the converging lens 44, and is incident on the light receiving unit 42. The light emitting unit 41 may emit visible light or emit invisible light such as infrared light or ultraviolet light. The LiDAR sensor 20 is configured to emit light to the object, and to acquire a distance to the object based on time until the return light is detected. The MEMS mirror 43 is configured to freely change a direction in which the light reflected by the MEMS mirror 43 is emitted. The LiDAR sensor 20 is configured to acquire information in a wide range by changing the emission direction of the reflected light by the MEMS mirror 43.

Figure 4:
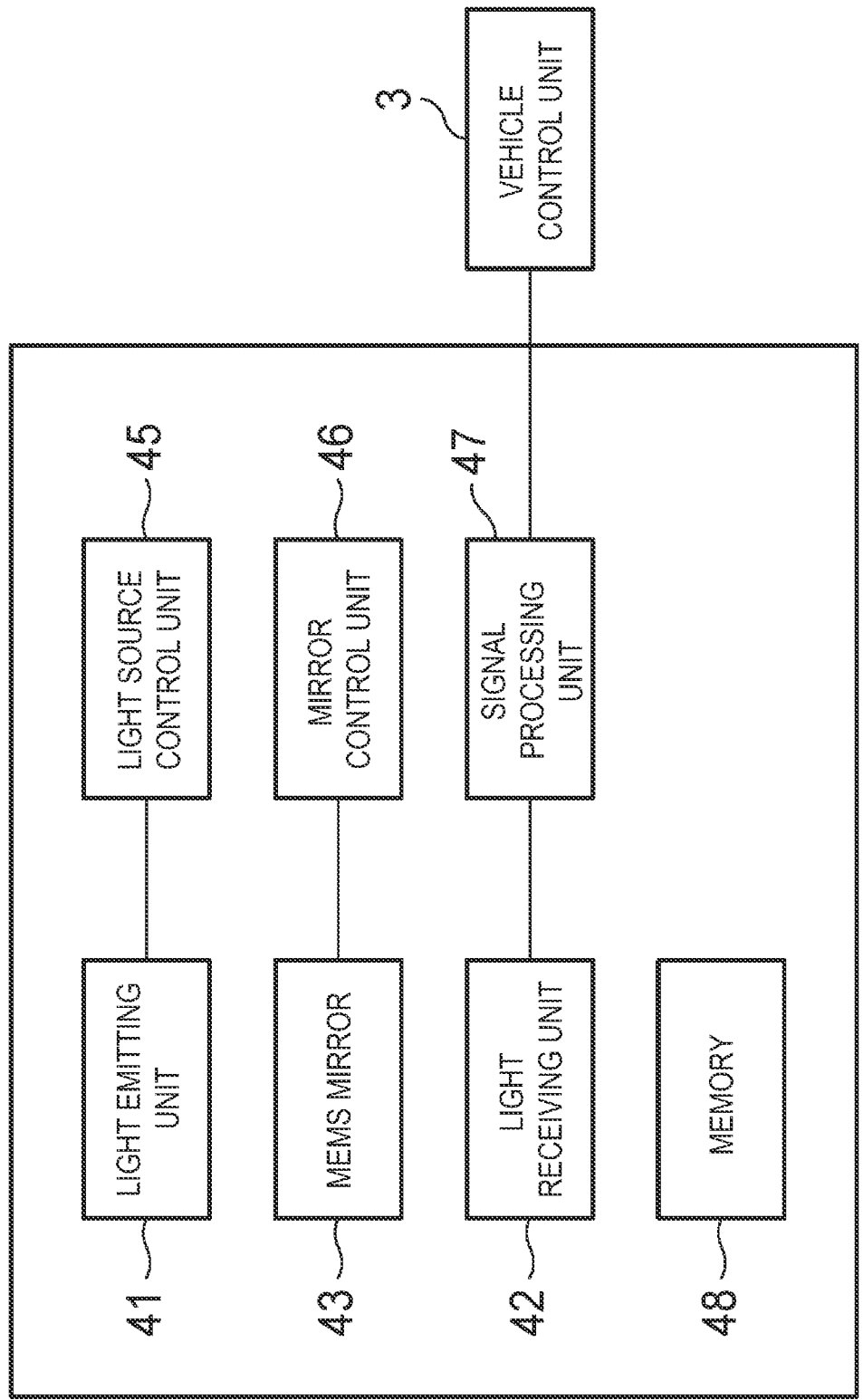
FIG. 4 is a block diagram showing the LiDAR sensor.

FIG. 4 is a block diagram showing the LiDAR sensor 20. As shown in FIG. 4, the LiDAR sensor 20 includes the light emitting unit 41, a light source control unit 45, the MEMS mirror 43, a mirror control unit 46, the light receiving unit 42, a signal processing unit 47, and a memory 48. The light source control unit 45 is configured to control an operation of the light emitting unit 41. The mirror control unit 46 is configured to control an operation of the MEMS mirror 43. The memory 48 is a rewritable recording unit. The signal processing unit 47 is configured to process a signal output from the light receiving unit 42 and to output the processed signal to a vehicle control unit 3. The vehicle control unit 3 is configured to control an operation of the vehicle 1.

The vehicle control unit 3 is configured to control operations of an engine, a brake device, and a steering device according to a signal output in response to an output from the LiDAR sensor 20 or another sensor, an operation of a steering wheel of a driver, an operation of an accelerator pedal of the driver, or an operation of a brake pedal of the driver. The vehicle control unit 3 is configured to perform automatic driving of the vehicle 1. Alternatively, the vehicle control unit 3 is configured to support driving of the driver.

The signal processing unit 47 includes a processor and a memory. Examples of the processor include a CPU, an MPU, and a GPU. The processor may include a plurality of processor cores. Examples of the memory include a ROM and a RAM. In the ROM, a program for executing the above-described processing may be stored. The program may include an artificial intelligence program. Examples of the artificial intelligence program include a learned neural network based on deep learning. The processor is configured to specify at least a part of programs stored in the ROM, to load the programs on the RAM, and to execute the processing in cooperation with the RAM. The signal processing unit 47 may be implemented by a dedicated integrated circuit such as a microcontroller, an FPGA, or an ASIC.

Figure 5:
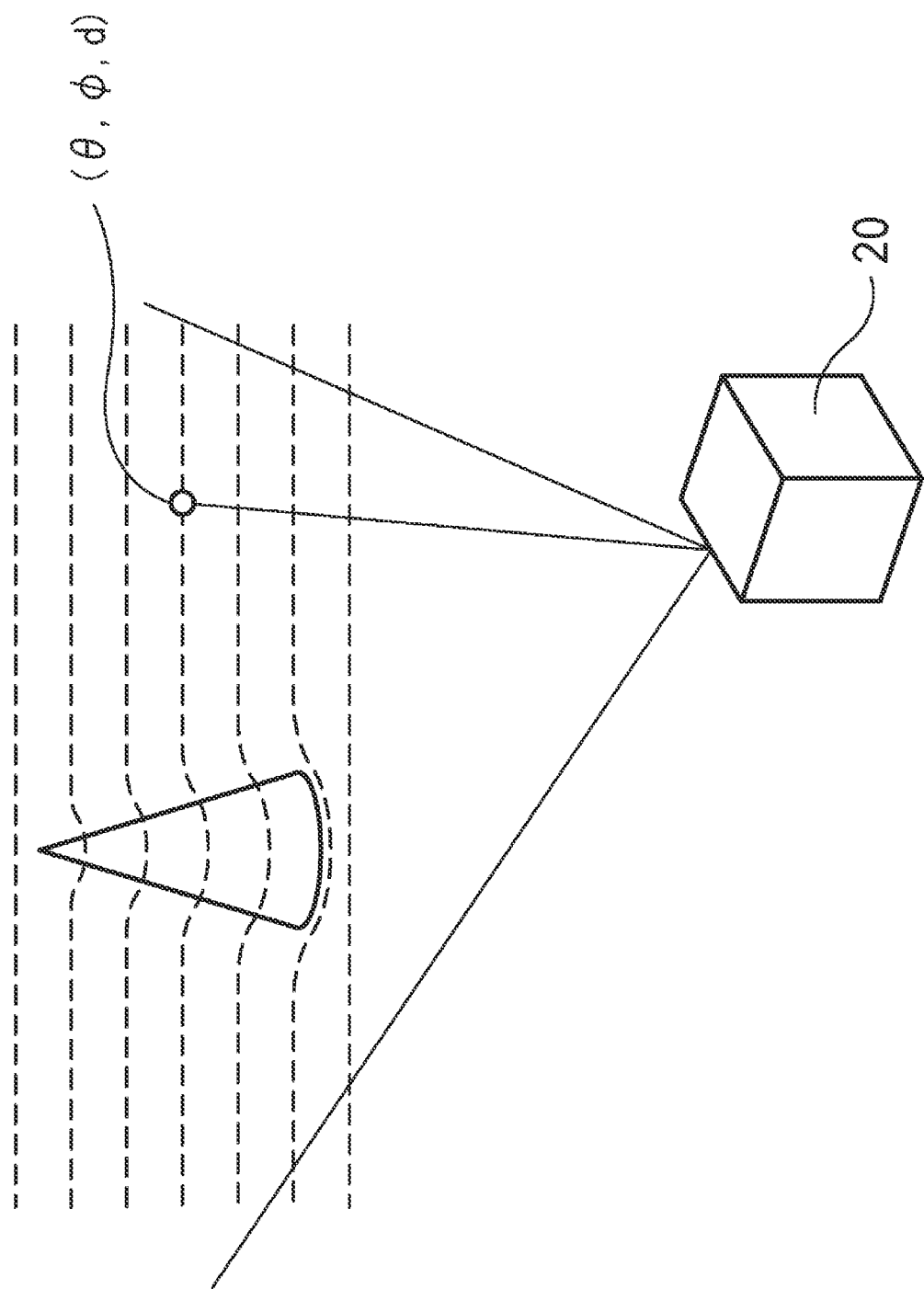
FIG. 5 shows a detection principle of the LiDAR sensor.

A detection principle of the LiDAR sensor 20 will be briefly described with reference to FIG. 5.

The signal processing unit 47 acquires information indicating how much time is taken for light emitted in which direction to hit the object and be reflected. Based on this, the signal processing unit 47 outputs direction information and a distance to the object in the direction.

Generally, the LiDAR sensor 20 is configured to output data of an azimuth angle θ [°], an elevation angle φ [°], and a distance d [m].

For example, the light source control unit 45 is configured to control the light emitting unit 41 such that the light emitting unit 41 emits light at predetermined time intervals. The mirror control unit 46 is configured to set 100 detection points in a vertical direction and 360 detection points in a horizontal direction in a certain detection range. The mirror control unit 46 is configured to control the MEMS mirror 43 such that the MEMS mirror 43 sequentially reflects the light incident on the MEMS mirror 43 from the light emitting unit 41 toward each detection point.

The light receiving unit 42 is configured to detect the return light that hits the object and is reflected by the object at each measurement point, and to output to the signal processing unit 47 a fact that the return light is detected. Since the MEMS mirror 43 sequentially reflects the light emitted from the light emitting unit 41 toward each measurement point, the return light sequentially detected by the light receiving unit 42 can be treated as light reflected from each measurement point. For example, when 36000 detection points are set, return light detected at a first time and return light detected at a 36001th time can be treated as light returning from the same direction. Alternatively, in a case in which 0.01 seconds are taken to emit light toward all detection points of 360000 detection points, light emitted after 0.01 seconds from a certain time and light emitted after 0.02 seconds from the certain time can be treated as light emitted in the same direction.

The signal processing unit 47 measures, for each measurement point, time from a time when the light emitting unit 41 emits light to a time when the return light is detected. The signal processing unit 47 calculates the distance to the object based on the measured time. In this way, the signal processing unit 47 outputs the distance in association with the direction of each detection point. The signal processing unit 47 outputs data such as $(\theta, \varphi, d)$ in order to indicate that a distance in a certain direction $(\theta, \varphi)$ is d.

As shown in FIG. 2, the outer cover 12 is provided in a direction in which the light is emitted from the light emitting unit 41 of the LiDAR sensor 20 and in a direction in which the light is incident on the light receiving unit 42. The outer cover 12 is often formed of a curved surface due to design restrictions of the vehicle 1. In particular, as shown in FIG. 1, when the LiDAR sensor 20 is provided at a corner portion of the vehicle 1, such as the right front portion, the left front portion, the right rear portion, and the left rear portion of the vehicle 1, a portion 12a where a curvature of the curved surface of the outer cover 12 locally increases is present as shown in FIG. 2.

When the light of the LiDAR sensor 20 passes through the portion 12a where the curvature locally increases in this way, the light is refracted. Therefore, the LiDAR sensor 20 measures a distance in a direction deviated from the originally assumed direction. Therefore, in the LiDAR sensor 20 according to the present embodiment, a direction of large refraction is specified and recorded in the memory 48 before a product is shipped, and the LiDAR sensor 20 does not output data of the direction in the product after the shipment. This processing will be described in detail.

Figure 6:
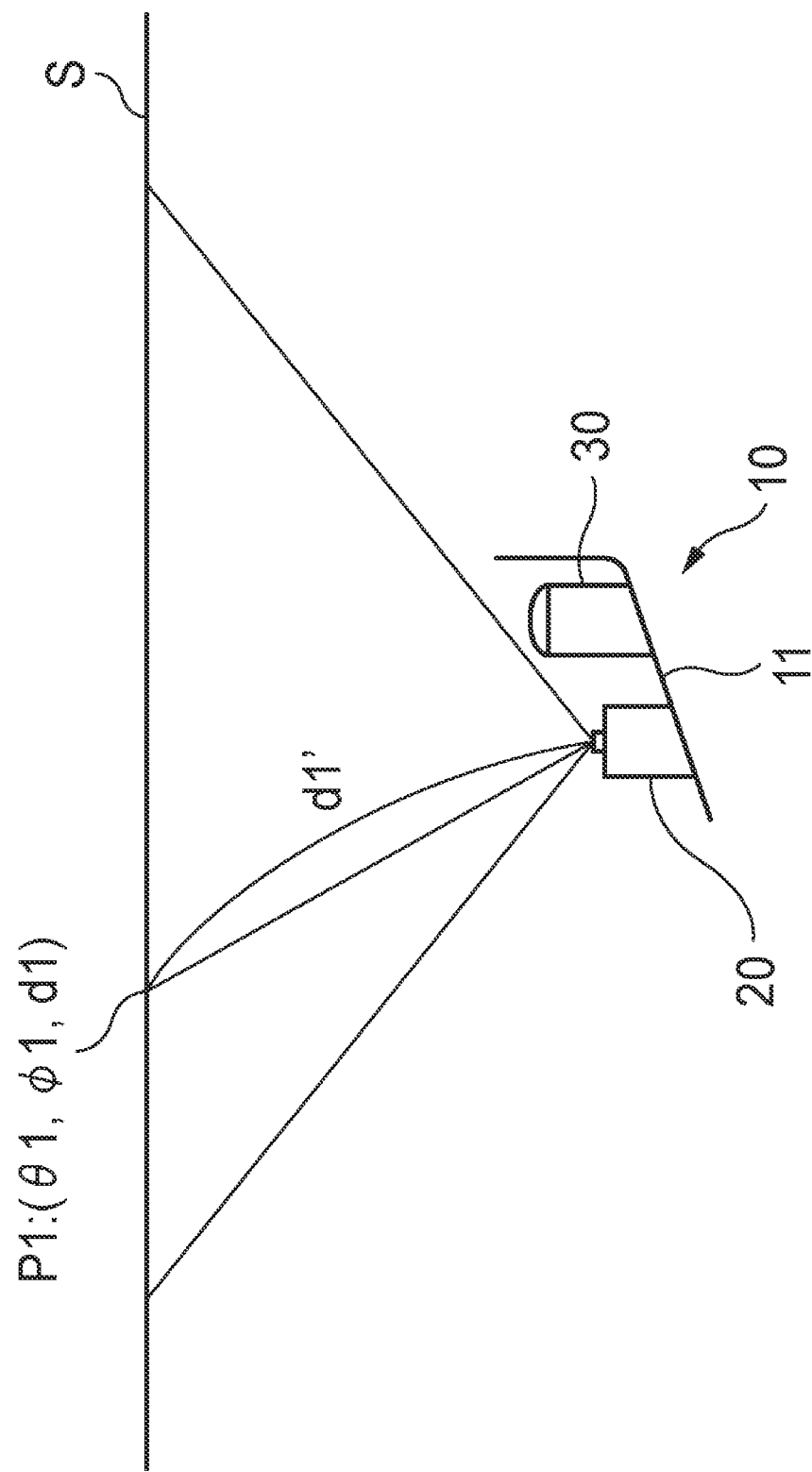
FIG. 6 is a schematic view when sensing is performed in a state in which an outer cover is not attached to the LiDAR sensor.

FIG. 6 shows a state in which the LiDAR sensor 20 is operated toward a standard screen S in a state in which the outer cover 12 is not attached to the LiDAR sensor unit 10.

Figure 7:
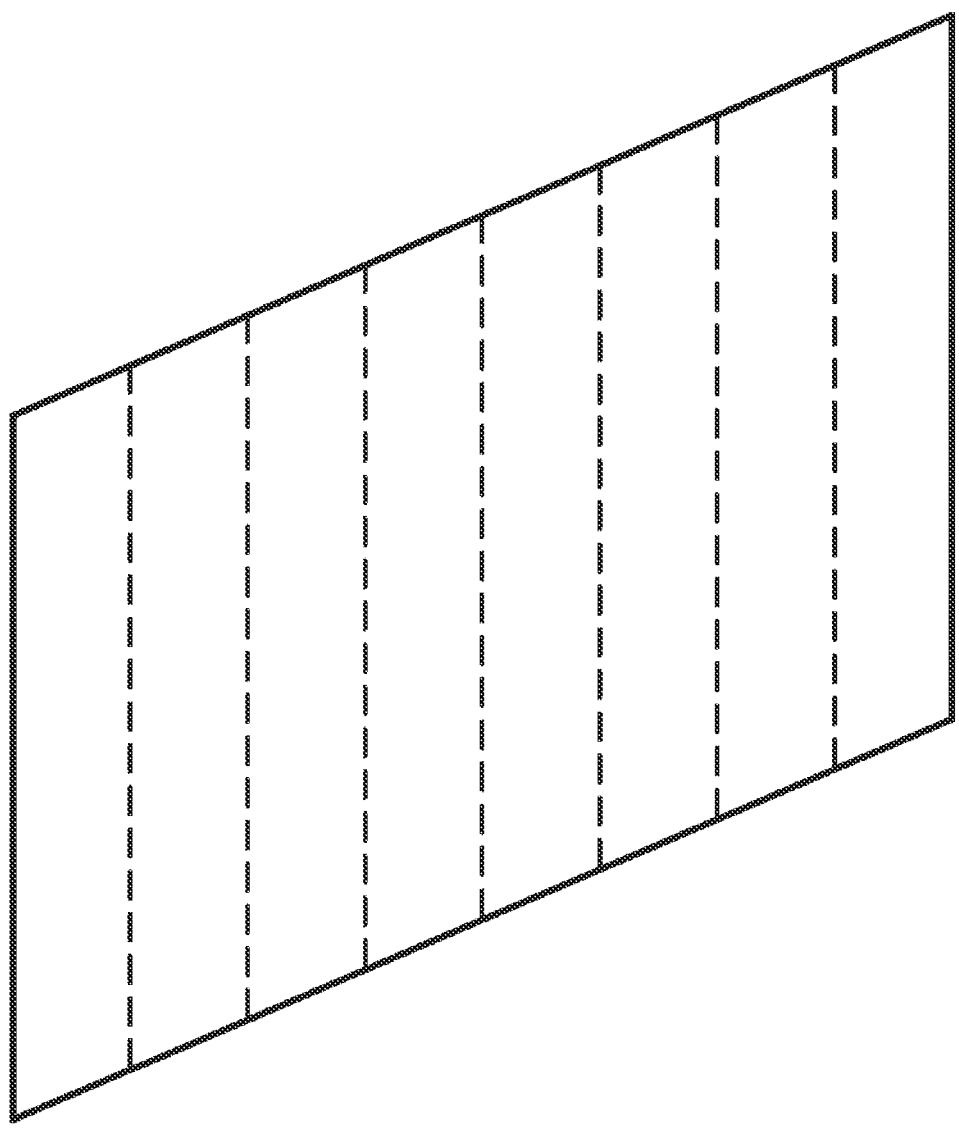
FIG. 7 is a schematic view showing a sensing result of the sensing in the state shown in FIG. 6.
Figure 9:
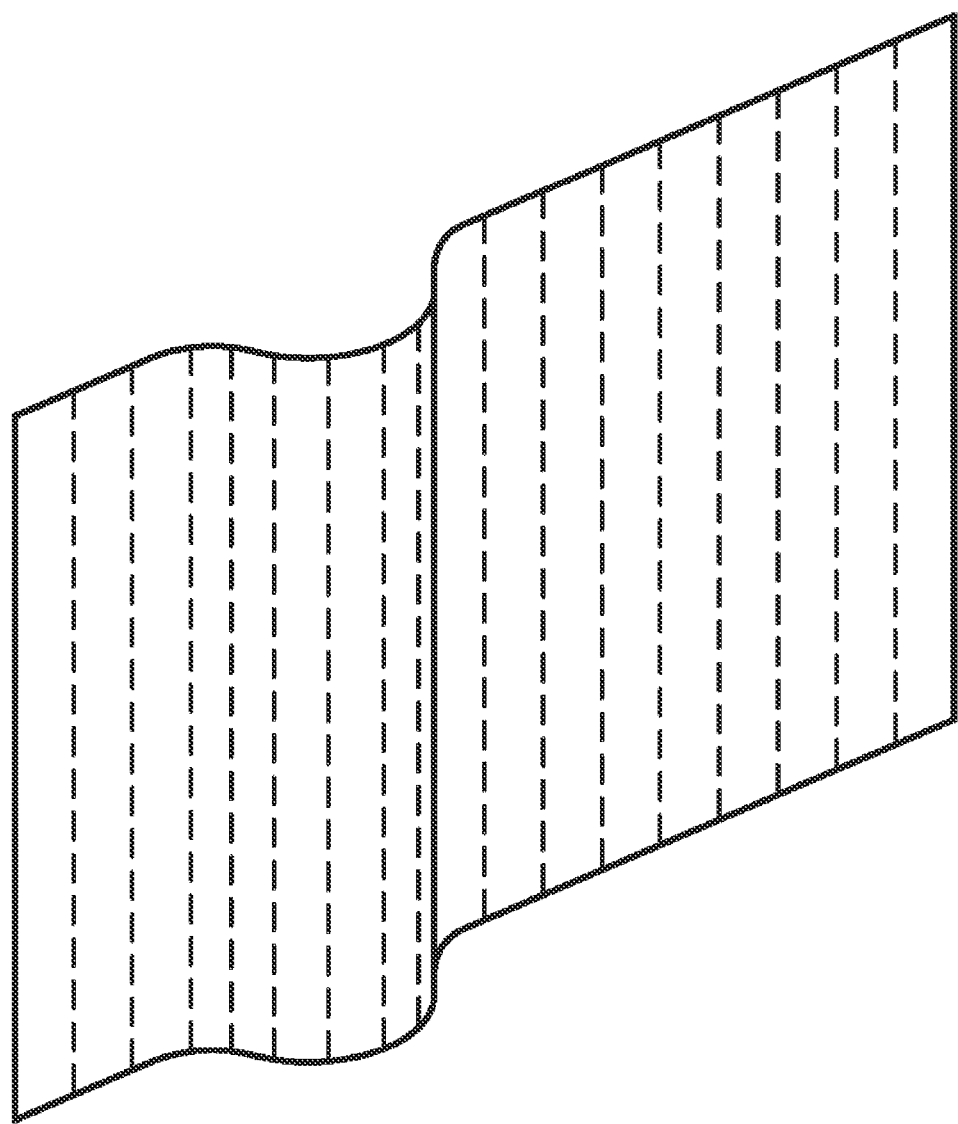
FIG. 9 is a schematic view showing a sensing result of the sensing in the state shown in FIG. 8.

FIG. 7 a visualization of an output of the LiDAR sensor 20 that is output in the state shown in FIG. 6. FIGS. 7 and 9 are schematic views showing the output of the LiDAR sensor 20. A large number of output points are actually present. However, FIGS. 7 and 9 are shown with the number of points smaller than the number of the actual output points for convenience of drawing.

The standard screen S is a flat screen having a predetermined size. In FIG. 6, the LiDAR sensor 20 is operated by separating the standard screen S from the LiDAR sensor 20 by a predetermined distance. Since the standard screen S is flat, a point group of the measurement points in the output of the LiDAR sensor 20 also forms a flat surface. The signal processing unit 47 records, in the rewritable memory 48, an output when the standard screen S is sensed in a state in which the outer cover 12 is not attached to the LiDAR sensor unit 10.

Figure 8:
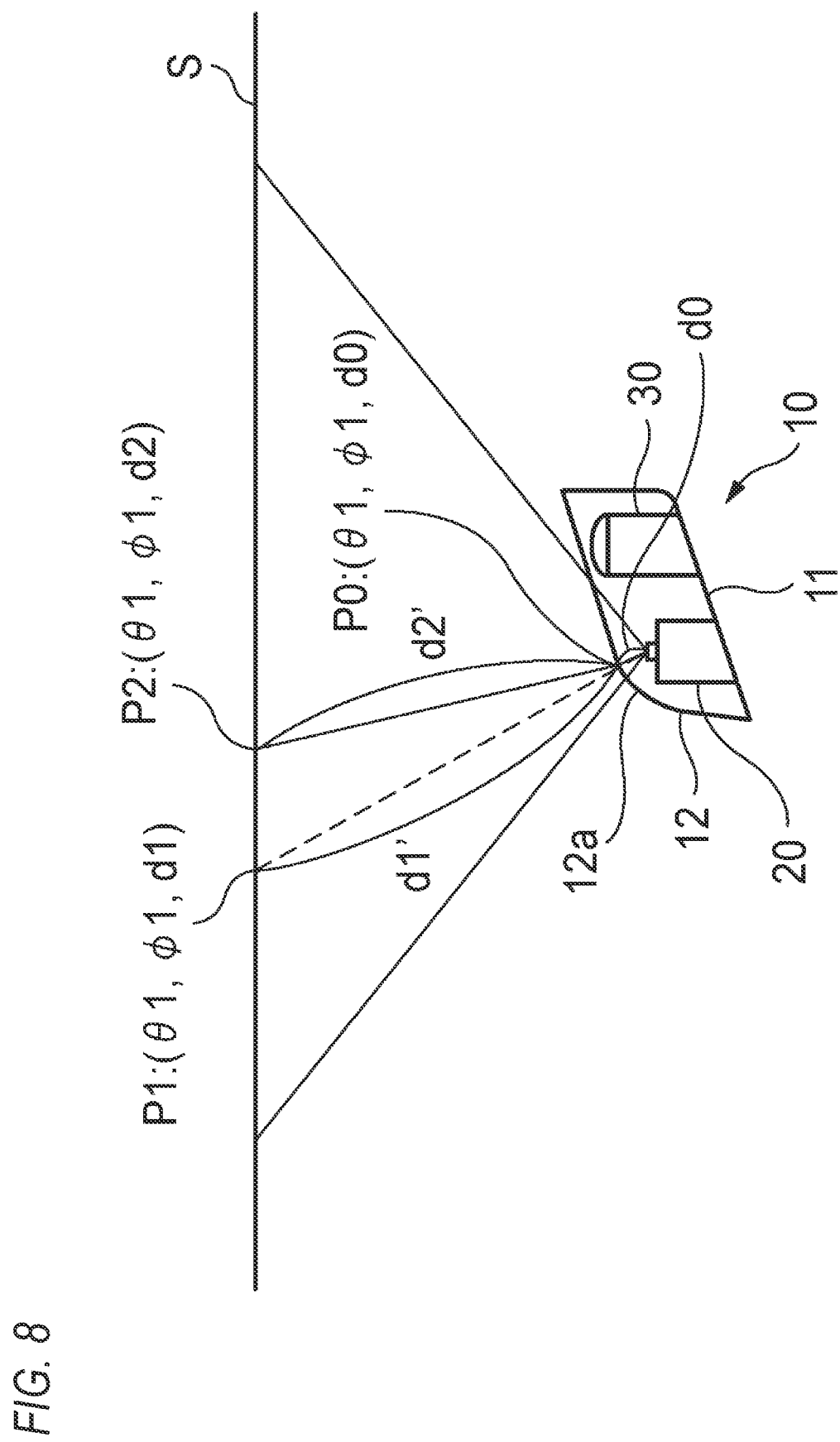
FIG. 8 is a schematic view when sensing is performed in a state in which the outer cover is attached to the LiDAR sensor.

FIG. 8 shows a state in which the LiDAR sensor 20 is operated toward the standard screen S in a state in which the outer cover 12 is attached to the LiDAR sensor unit 10. FIG. 9 a visualization of an output of the LiDAR sensor 20 that is output in the state shown in FIG. 8.

When the LiDAR sensor 20 is operated in a state in which the outer cover 12 is attached, as shown in FIG. 8, the light is refracted at the portion 12a where the curvature is locally large in the outer cover 12. In FIG. 8, a trajectory of the passing light in the case in which the outer cover 12 is not provided is shown by a broken line. In FIG. 8, a state of the refraction of the light is shown in a deformed manner.

As shown in FIG. 6, coordinates at which the light emitted in a direction $(\theta 1, \varphi 1)$ toward the portion 12a having the large curvature reaches the standard screen S are expressed as $P1=(\theta 1, \varphi 1, d1)$. That is, in the direction $(\theta 1, \varphi 1)$, a distance to the standard screen S is d1.

As shown in FIG. 8, coordinates at which the light emitted in the direction $(\theta 1, \varphi 1)$ toward the portion 12a having the large curvature and refracted by the portion 12a reaches the standard screen S are expressed as $P2=(\theta 1, \varphi 1, d2)$.

That is, actually, if the outer cover 12 is attached even though the distance to the standard screen S in the direction $(\theta 1, \varphi 1)$ is d1, the LiDAR sensor 20 erroneously recognizes the distance to the standard screen S in the direction $(\theta 1, \varphi 1)$ as d2. Therefore, when data output from the LiDAR sensor 20 as it is visualized, as shown in FIG. 9, the visualized data is different from data in FIG. 7.

Therefore, in the present embodiment, the output when the standard screen S is sensed in the state in which the outer cover 12 is attached to the LiDAR sensor unit 10 is compared with the output when the standard screen S is sensed in the state in which the outer cover 12 is not attached to the LiDAR sensor unit 10. When a difference of distances in the same direction is equal to or greater than a threshold value, the LiDAR sensor 20 does not output the distances in the direction.

That is, in examples shown in FIGS. 6 to 9, for the direction $(\theta 1, \varphi 1)$, when an absolute value $\Delta d=|d2-d1|$ of a difference between the distance d1 when the outer cover 12 is not attached to the LiDAR sensor unit 10 and the distance d2 when the outer cover 12 is attached to the LiDAR sensor unit 10 is larger than a threshold value da ($\Delta d>da$), the direction is recorded in the memory 48 as a non-output direction.

In the shown example, the LiDAR sensor 20 calculates a length of an optical path along which the refracted light travels as the distance d2. That is, the distance d2 is a sum of a distance d0 from the LiDAR sensor 20 to the portion 12a and a distance d2' from the portion 12a to a point P2. When a distance from the portion 12a to a point P1 is d1'. $\Delta d=d2-d1=(d0+d2')-(d0+d1')=d2'-d1'$. When d2'−d1' is larger than the predetermined value da, the signal processing unit 47 records the direction $(\theta 1, \varphi 1)$ in the memory 48 as the non-output direction.

Figure 10:
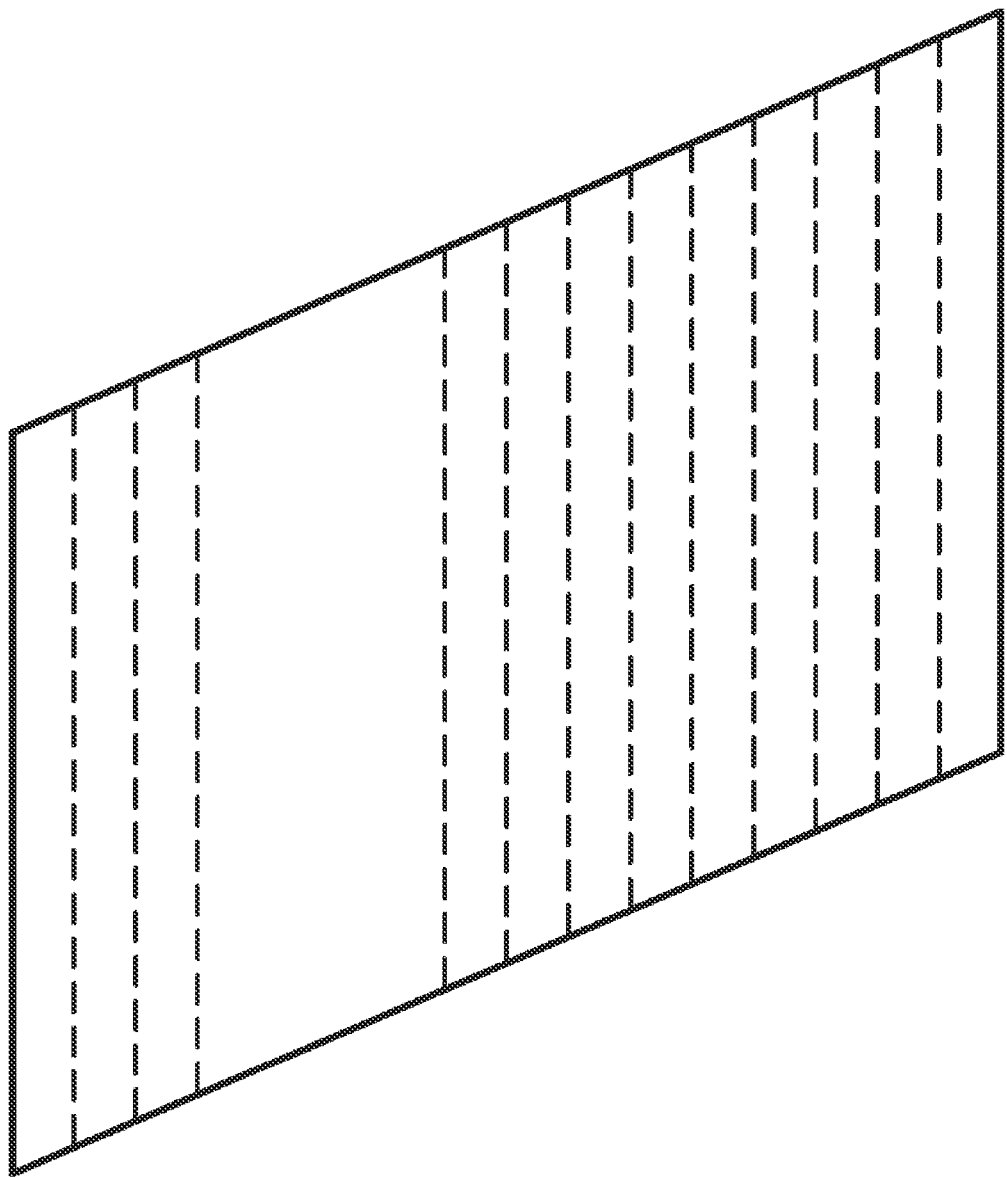
FIG. 10 is a schematic view showing a corrected sensing result.

Further, when the LiDAR sensor 20 is normally used, the signal processing unit 47 reads out the non-output direction from the memory 48 and does not output data for a direction corresponding to the non-output direction as shown in FIG. 10. FIG. 10 visualizes and shows output data output from the signal processing unit 47 to the vehicle control unit 3 when the inspection screen S is detected. As shown in FIG. 10, even if a part of the data output from the LiDAR sensor 20 is missing, an entire image can be grasped.

In general, a large number of measurement points (measurement directions) of the LiDAR sensor 20 are present. Therefore, even if measurement points affected by the refraction of the outer cover 12 are ignored, a good resolution is easily maintained. Rather, according to the present embodiment, since it is not necessary to correct data due to refraction of the outer cover 12 or execute exceptional processing, a processing load of the signal processing unit 47 is reduced.

The signal processing unit 47 may determine whether a ratio n/m of the number (n) of non-detection directions to the number (m) of all the measurement points is equal to or greater than 0.1. When the ratio is equal to or greater than 0.1, the signal processing unit 47 may output an error signal to the vehicle control unit 3 and may output data for the direction corresponding to the non-output direction.

In the above-described embodiment, an example has been described in which the measurement points before and after the attachment of the outer cover 12 are treated.

However, the present invention is not limited thereto. In the LiDAR sensor unit 10, an inner lens may be provided inside a space formed by the housing 11 and the outer cover 12. Even before and after the attachment of the inner lens, a direction to be measured may change due to refraction of the inner lens. The present invention can also be applied to this case.

That is, the output when the standard screen S is sensed in the state in which the inner lens is attached to the LiDAR sensor unit 10 is compared with the output when the standard screen S is sensed in the state in which the inner lens is not attached to the LiDAR sensor unit 10. When a difference of distances in the same direction is equal to or greater than a threshold value, the LiDAR sensor 20 may not output the distances in the direction.

In the present embodiment, the output when the standard screen S is sensed in the state in which the outer cover 12 is not attached to the LiDAR sensor unit 10 and the output when the standard screen S is sensed in the state in which the outer cover 12 is attached to the LiDAR sensor unit 10 are recorded in the rewritable memory 48.

The outer cover 12 may be scratched or damaged by a flying stone or the like. As described above, refraction may occur at a portion where a scratch is formed or the light may be scattered, and the distance may not be measured properly. Even if the scratch is small and inconspicuous, if the scratch is located on an extension line of the measurement direction, the LiDAR sensor 20 is affected by the scratch. However, it is not realistic to replace the outer cover 12 since the small scratch is formed.

Therefore, in the present embodiment, it is possible to periodically update information recorded in the memory 48. For example, in a periodic inspection of the vehicle or the like, an inspection using the above-described standard screen S is performed. In the inspection, the output when the standard screen S is sensed in the state in which the outer cover 12 is not attached to the LiDAR sensor unit 10 and the output when the standard screen S is sensed in the state in which the outer cover 12 is attached to the LiDAR sensor unit 10 can be acquired and rewritten periodically. Accordingly, it is possible not to output the data for the direction in which the distance cannot be measured due to the scratch, and it is possible to avoid a defect caused by the scratch.

Even when the outer cover 12 is replaced, by updating the information recorded in the memory 48, it is possible not to output data in a direction in which a degree of refraction is large according to a shape of the outer cover 12 after the replacement.

An electronic circuit that is configured to implement a function of specifying the non-output direction and not outputting the distance in the non-output direction to the vehicle control unit 3 and that is described with reference to FIGS. 6 to 10 may be provided separately from an electronic circuit configured to implement a function of detecting the incidence of the light on the light receiving unit and calculating the distance of the object. That is, the electronic circuit incorporated in the LiDAR sensor 20 is configured to implement the function of detecting the incidence of the light on the light receiving unit and calculating the distance of the object, and the electronic circuit configured to implement the function of specifying the non-output direction and not outputting the distance in the non-output direction to the vehicle control unit 3 may be provided in a middle of a communication path between the LiDAR sensor 20 and the vehicle control unit 3.

Second Embodiment

A LiDAR sensor can measure a precise distance. The LiDAR sensor can acquire a large amount of measurement data at an extremely short time interval. However, as described above, since the distance can be measured with an extremely high resolution and the measurement data can be acquired at the extremely short time interval, the LiDAR sensor is greatly affected by a fluctuation due to a vibration of the vehicle, sound, heat, wind, mere noise, or the like.

In order to be used for the automatic driving of the vehicle, an output of the LiDAR sensor including fine distance information such as 0.1 mm or less is unnecessary.

Therefore, in a second embodiment of the present invention to be described next, the LiDAR sensor unit 10 suitable for a vehicle that can be automatically driven is provided.

The LiDAR sensor unit 10 according to the second embodiment has the same structure and detection principle as the LiDAR sensor unit 10 described with reference to FIGS. 1 to 5 in the above-described first embodiment. Therefore, the description of the structure and the detection principle of the LiDAR sensor unit 10 according to the second embodiment will be omitted.

Figure 11:
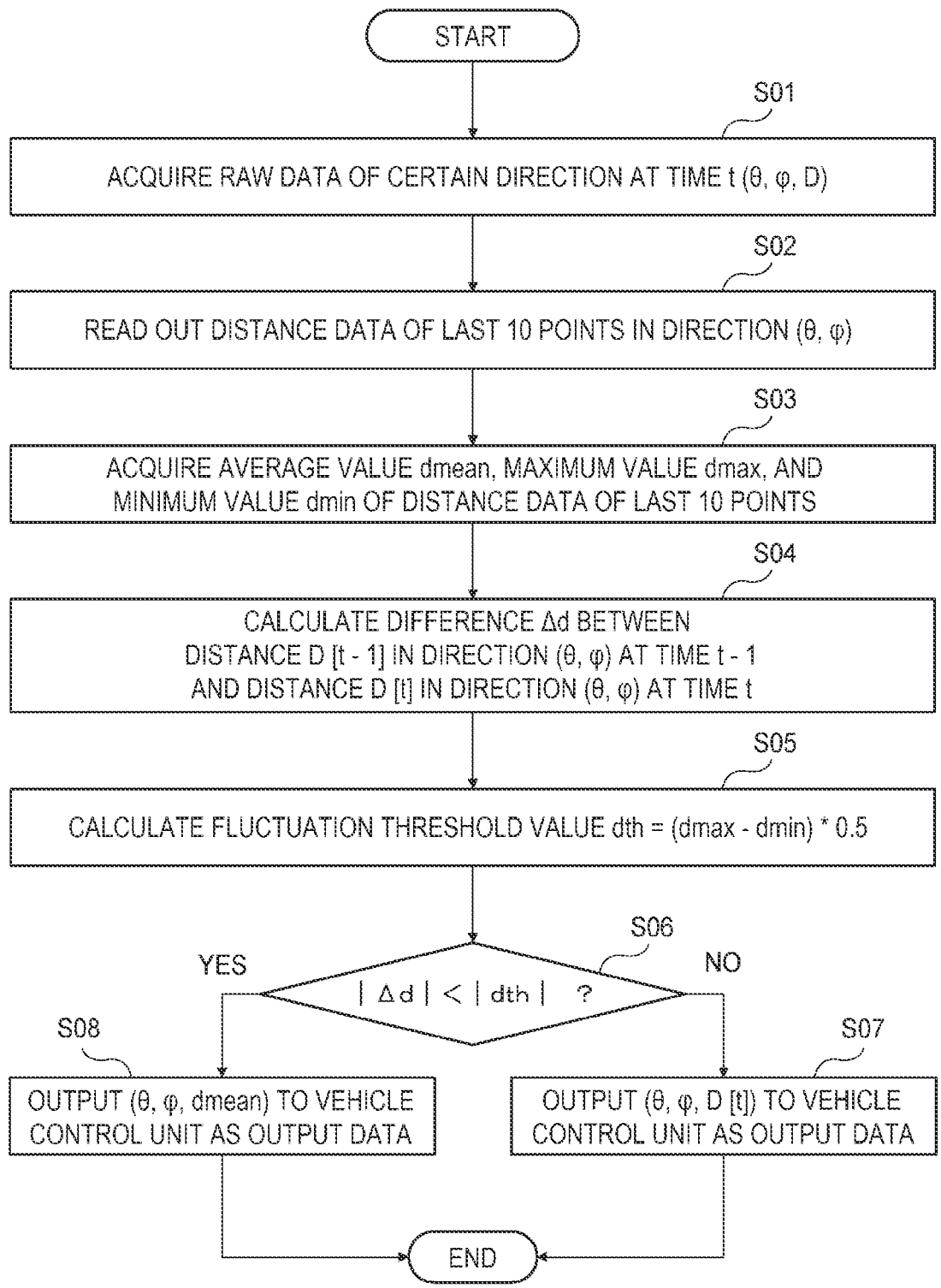
FIG. 11 is a flowchart showing processing executed by a signal processing unit.

FIG. 11 is a flowchart showing processing executed by the signal processing unit 47.

As shown in FIG. 11, the signal processing unit 47 calculates that a distance to an object in the direction ($\theta$, $\varphi$) at the time t is D (step S01). That is, raw data at the time t is ($\theta$, $\varphi$, D). The signal processing unit 47 records the raw data ($\theta$, $\varphi$, D) at the time t in the memory 48.

Next, the signal processing unit 47 reads out last 10 distances for the certain direction ($\theta$, $\varphi$) (step S02). The signal processing unit 47 extracts a minimum value dmin and a maximum value dmax from these values. The signal processing unit 47 calculates an average value dmean of the last 10 distances for the certain direction ($\theta$, $\varphi$) (step S03). The signal processing unit 47 records dmin, dmax, and dmean in the memory 48.

Next, the signal processing unit 47 calculates, for the certain direction ($\theta$, $\varphi$), a difference $\Delta$d between an immediately preceding distance D [t−1] and a distance D [t] measured this time (step S04). The signal processing unit 47 calculates $\Delta$d=D [t]−D [t−1]. The signal processing unit 47 records the difference $\Delta$d in the memory 48.

The signal processing unit 47 reads out the minimum value dmin and the maximum value dmax from the memory 48 and multiplies a difference between the minimum value dmin and the maximum value dmax by a coefficient of 0.5 to calculate a fluctuation threshold value dth (step S05). The signal processing unit 47 records the fluctuation threshold value dth in the memory 48.

The signal processing unit 47 reads out the difference $\Delta$d and the fluctuation threshold value dth from the memory 48, and compares absolute values of the difference $\Delta$d and the fluctuation threshold value dth (step S06).

When the absolute value of the difference Δd is larger than the absolute value of the fluctuation threshold value dth (step S06: No), the signal processing unit 47 outputs the raw data D [t] as the distance in the certain direction (θ, φ). That is, the signal processing unit 47 outputs (θ, q, D [t]) to the vehicle control unit 3 as measurement data at the time t (step S07).

When the absolute value of the difference Δd is smaller than the absolute value of the fluctuation threshold value dth (step S06: Yes), the signal processing unit 47 outputs the average value dmean as the distance in the certain direction (θ, φ. That is, the signal processing unit 47 outputs (θ, φ, dmean) to the vehicle control unit 3 as measurement data at the time t (step S08).

Figure 12:
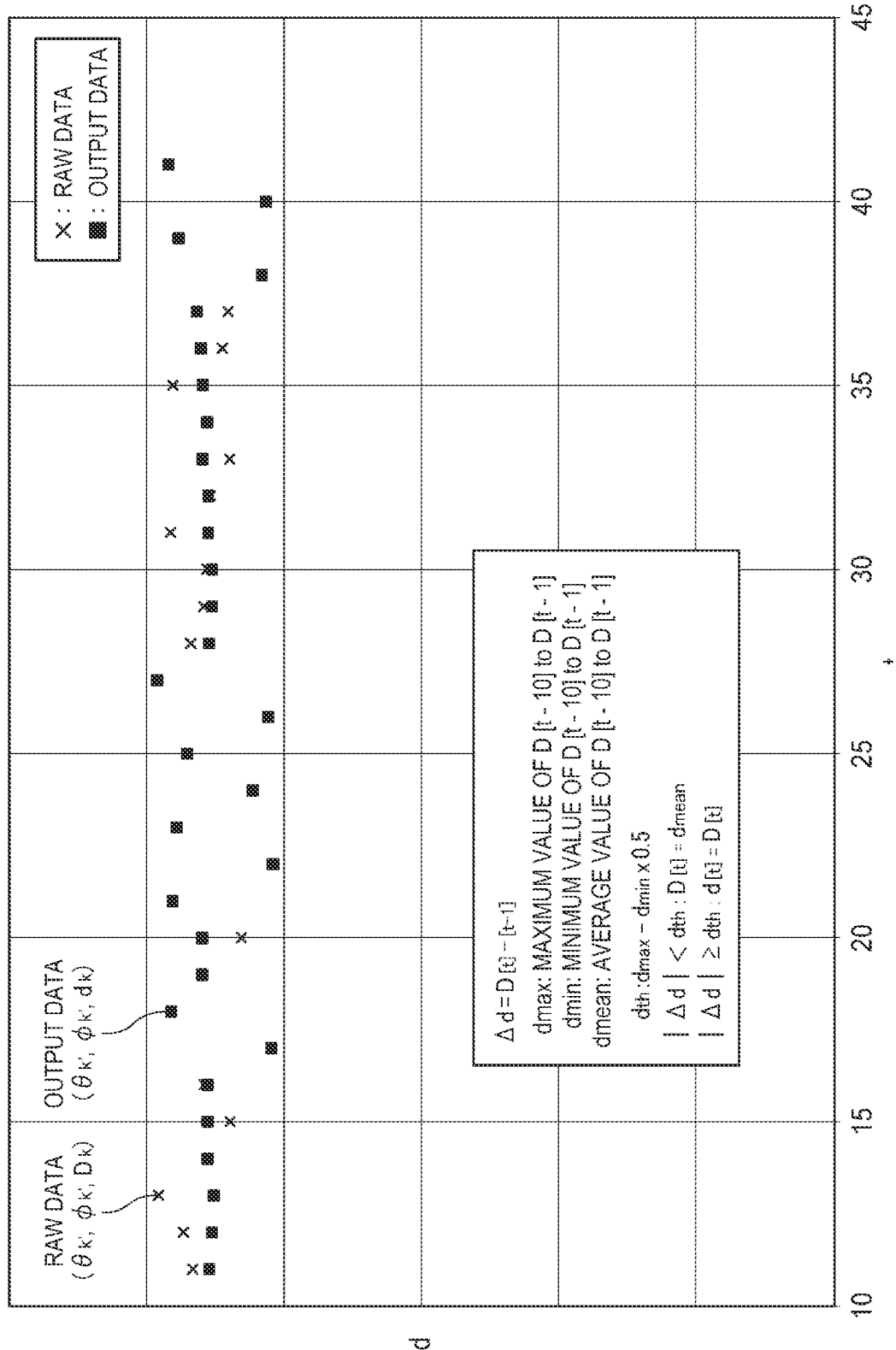
FIG. 12 is a graph plotting output data and raw data.

FIG. 12 is a graph plotting the measurement data and the raw data that are obtained in this way. In FIG. 12, for the certain direction (θ, φ), the distance D of the raw data output from the LiDAR sensor 20 is indicated by X, and the distance d of data (referred to as output data) that is processed by the signal processing unit 47 and is output to the vehicle control unit 3 is indicated by a square. A portion where the distance of the raw data and the distance of the output data overlap each other is represented by the distance (the square) of the output data.

As shown in FIG. 12, the fluctuation of the output data represented by the square is reduced as compared with the raw data represented by x.

Incidentally, the present inventor has noticed that the output of the LiDAR sensor is likely to fluctuate finely. However, even if the measurement data that fluctuates finely is output to the vehicle control unit 3 as it is, the vehicle control unit 3 does not control the vehicle 1 using a value that fluctuates finely in this way.

In order to reduce this fine fluctuation, it is conceivable that a certain threshold value is set and a fluctuation within the threshold value is not output to the vehicle control unit 3.

However, the present inventor has noticed that, in the output of the LiDAR sensor, the threshold value suitable for a plurality of factors such as a temperature, humidity, or a traveling state changes. That is, even if a certain threshold value is an appropriate threshold value in a certain situation, too many fluctuations beyond the threshold value occur and the threshold value becomes meaningless in another situation. Alternatively, too many fluctuations below the threshold value occur and only certain distance data is output in another situation.

Therefore, the present inventor has completed the present invention in which the distance data in a predetermined period is always accumulated, the threshold value is determined based on a maximum value and a minimum value during the predetermined period, and the measurement data is output to the vehicle control unit 3 with the distance within the threshold value that fluctuates depending on the time as a constant distance. According to this aspect, since the fluctuation threshold value dth suitable for the situation is appropriately set, it is possible to smooth the fluctuation of the distance data that fluctuates due to various factors with the appropriate fluctuation threshold value dth.

In the above-described embodiment, the reading of the nearest 10 distances in the certain direction has been described. However, the number of distances to be read out is not limited to 10. Any number of pieces of data may be read out. As the number of pieces of data to be read is set to be large, the data output to the vehicle control unit 3 is less likely to fluctuate. This coefficient may be fluctuated according to a driving situation or the like according to a signal or the like output from the vehicle control unit 3. For example, when it is assumed that there is little change in a state of the outside of the vehicle, such as during traveling on a highway, a large number of pieces of data may be read out.

In the above-described embodiment, it has been described that the coefficient of 0.5 is multiplied by (dmax−dmin) in order to calculate the fluctuation threshold value. However, the coefficient to be multiplied by (dmax−dmin) can be set freely. The coefficient can be set to a value of 0 to 1. When the coefficient is increased, it is possible to reduce the fluctuation in the distance output from the LiDAR sensor unit to the vehicle control unit 3. When the coefficient is reduced, the distance output from the LiDAR sensor unit to the vehicle control unit 3 is easily reproduced faithfully to the raw data output from the LiDAR sensor.

This coefficient may be fluctuated according to the driving situation or the like according to the signal or the like output from the vehicle control unit 3. For example, when it is assumed that there is little change in the state of the outside of the vehicle, such as during traveling on a highway, a large coefficient may be set.

In the above-described embodiment, an example has been described in which the average value dmean at last 10 points is set as the distance of the output data when the fluctuation value is within the fluctuation threshold value (step S06: Yes). However, the present invention is not limited thereto. Instead of the average value dmean, a distance of any of the last 10 points may be output, or the minimum value dmin or the maximum value dmax may be output.

Third Embodiment

A LiDAR sensor can measure a distance at a large number of measurement points, and can accurately grasp a surrounding situation. However, since the LiDAR sensor outputs a large number of measurement points in short time, a large burden is generated on a processing apparatus configured to process the measurement points. In a control of a vehicle in automatic driving or manual driving, some action is required when a situation changes.

Therefore, in a third embodiment of the present invention, a LiDAR sensor unit having an output suitable for the control of the vehicle is provided.

Next, a LiDAR sensor unit 110 according to the third embodiment of the present invention will be described.

The LiDAR sensor unit 110 according to the third embodiment also has the same structure as the LiDAR sensor unit 10 described with reference to FIGS. 1 to 3 in the above-described first embodiment. A detection principle of the LiDAR sensor unit 110 according to the third embodiment is also the same as the detection principle described with reference to FIG. 5. Therefore, the description of the structure and the detection principle of the LiDAR sensor unit 110 according to the third embodiment will be omitted.

Figure 13:
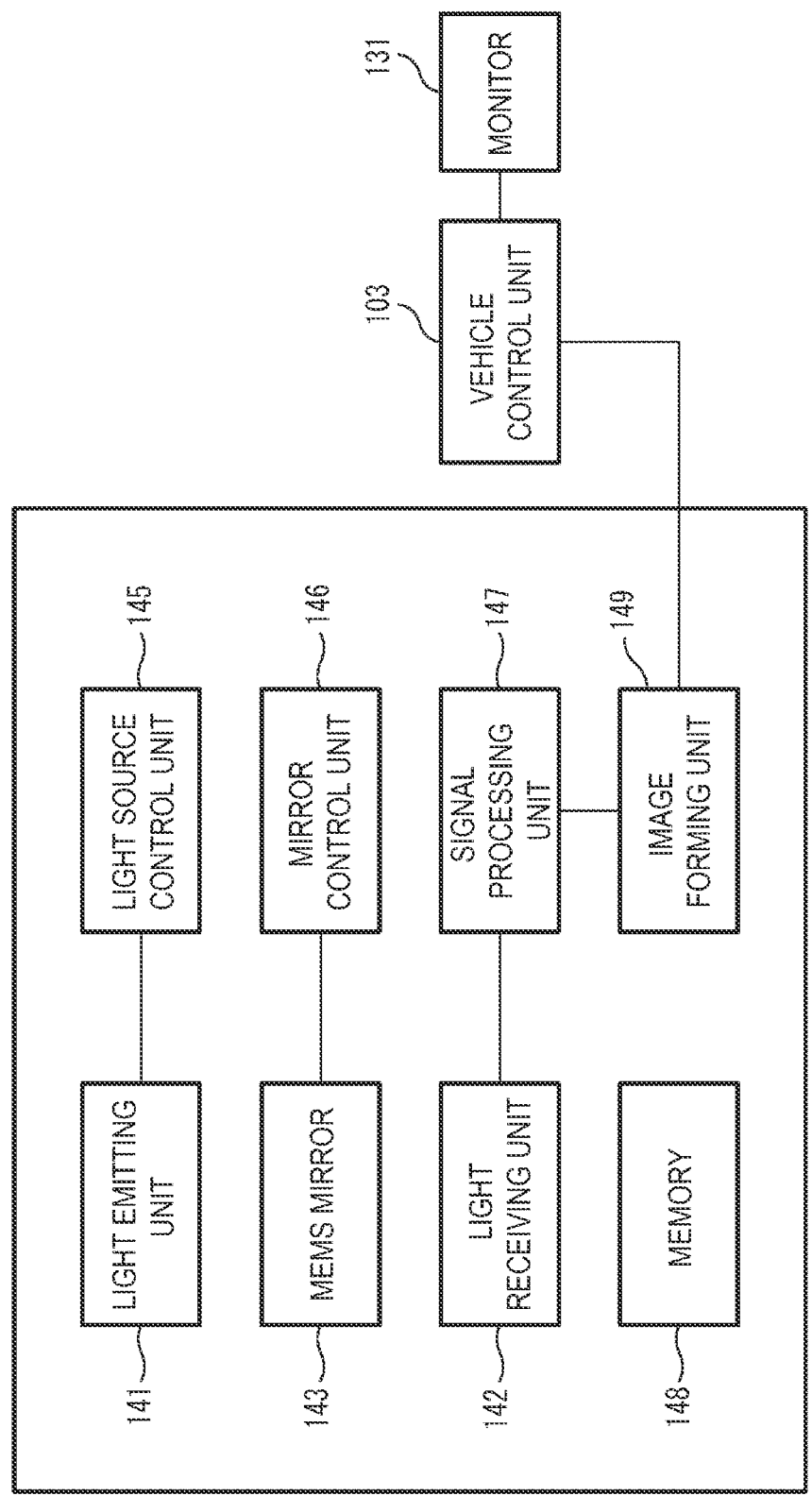
FIG. 13 is a block diagram showing a LiDAR sensor system.

A functional block of the LiDAR sensor unit 110 according to the third embodiment is different from a functional block of the LiDAR sensor unit 10 according to the first embodiment. FIG. 13 is a block diagram showing a LiDAR sensor 120 according to the third embodiment of the present invention. As shown in FIG. 13, the LiDAR sensor 120 includes a light emitting unit 141, a light source control unit 145, a MEMS mirror 143, a mirror control unit 146, a light receiving unit 142, a signal processing unit 147, a memory 148, and an image forming unit 149. The light source control unit 145 is configured to control an operation of the light emitting unit 141. The mirror control unit 146 is configured to control an operation of the MEMS mirror 143. The memory 148 is a rewritable recording unit. The signal processing unit 147 is configured to process a signal output from the light receiving unit 142 and to output the processed signal to the image forming unit 149. The vehicle control unit 103 is configured to control an operation of a vehicle 101. The image forming unit 149 is configured to form an image based on the signal output from the signal processing unit 147 and to output the image to the vehicle control unit 103.

Figure 14:
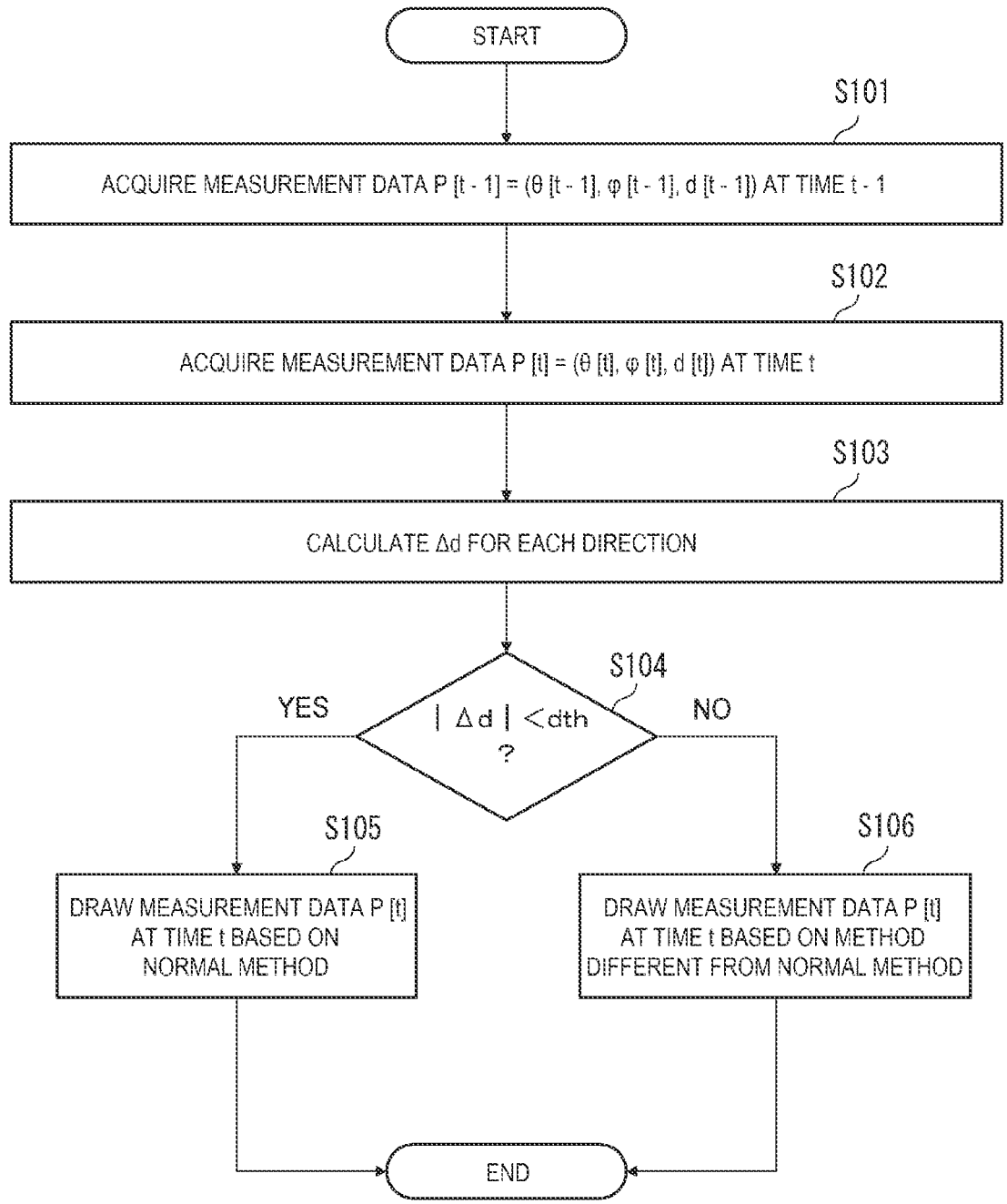
FIG. 14 is a flowchart showing processing executed by an image forming unit.
Figure 15:
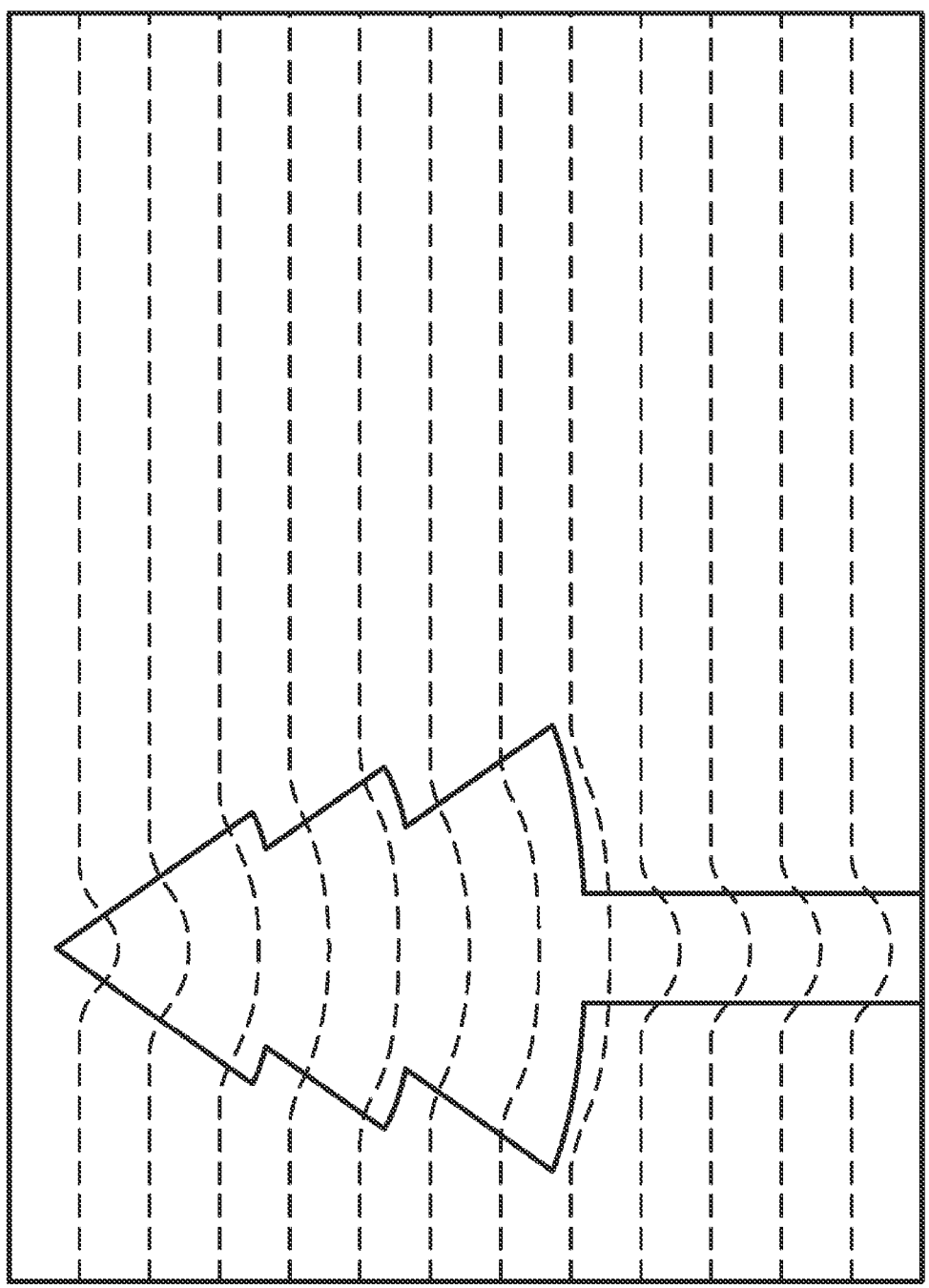
FIG. 15 shows a state of a front of the vehicle at a time t−1.

FIG. 14 is a flowchart showing processing executed by the image forming unit 149. FIG. 15 shows a state of a front of a vehicle at the time t−1 before predetermined time from the certain time t. A point group in FIG. 15 shows a visualization of measurement data of the LiDAR sensor 120 as it is. As shown in FIG. 15, at the time t−1, a tree T is present on a left side of a front of the vehicle 101. At the time t−1, the LiDAR sensor 120 measures the distance d for all measurement points. The image forming unit 149 acquires measurement data P [t−1]=(θ[t−1], φ [t−1], d [t−1]) at the time t−1 (step S101).

Figure 16:
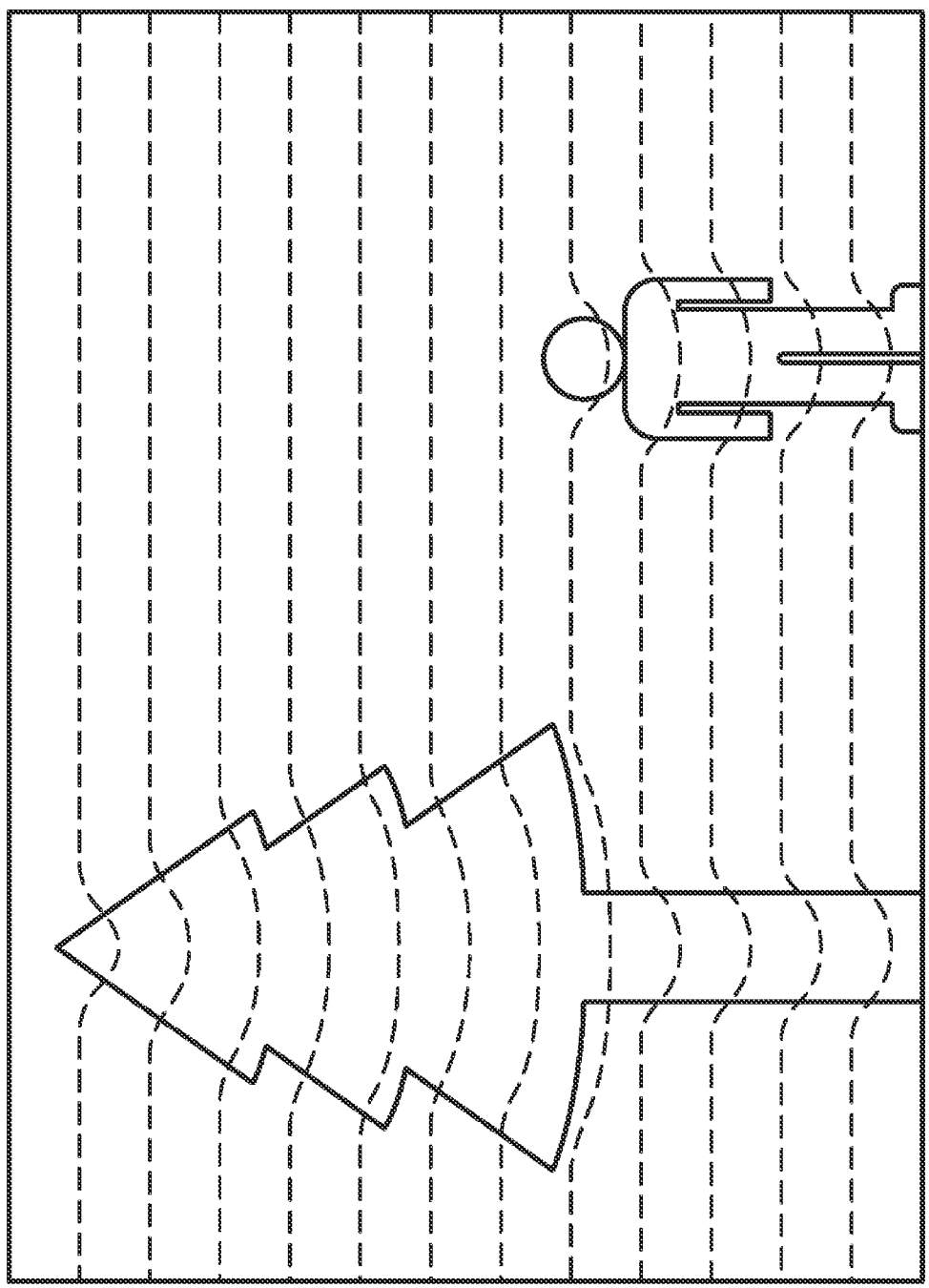
FIG. 16 shows a state of the front of the vehicle at a time t.

FIG. 16 shows a state of the front of the vehicle at the certain time t. A point group in FIG. 16 shows a visualization of measurement data of the LiDAR sensor 120 as it is. At the time t, the tree T is present on the left side of the front of the vehicle 101, and a pedestrian is present on a right side of the front of the vehicle 101. That is, when time changes from the time t−1 to the time t, the pedestrian enters the front of the vehicle.

At the time t, the LiDAR sensor 120 also measures the distance for all the measurement points. The image forming unit 149 acquires measurement data P [t]=(θ [t], φ [t], d [t]) at the time t (step S102).

The image forming unit 149 calculates the fluctuation Δd=d [t]−d [t−1] of the distance in the same direction (θ, φ) at the time t−1 and the time t (step S103).

Figure 17:
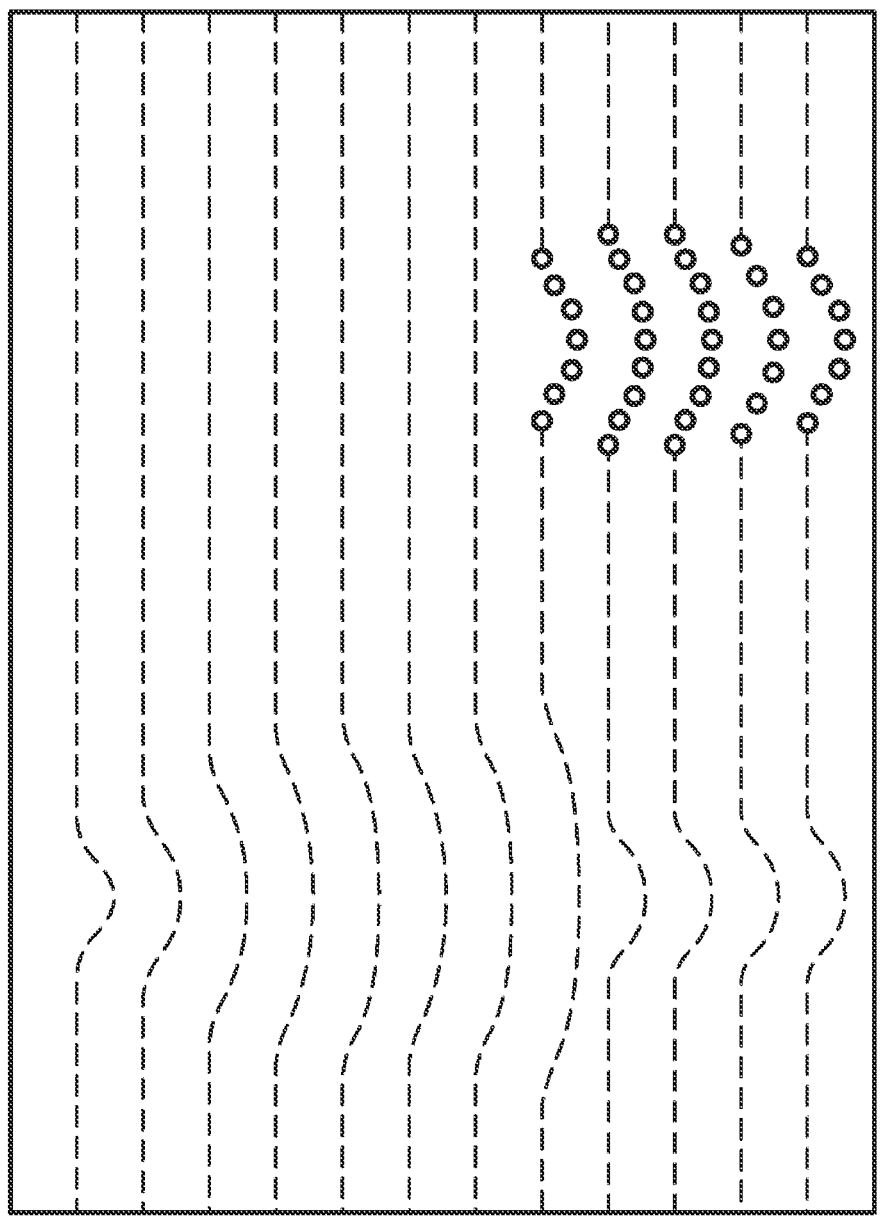
FIG. 17 shows an image output by the image forming unit at the time t.

The image forming unit 149 forms an image in which the output of the LiDAR sensor 120 at the time t is visualized. At this time, as shown in FIG. 17, the image forming unit 149 emphasizes a portion changed from the time t−1 to the time t to form an image.

First, the image forming unit 149 determines whether Δd is greater than the predetermined threshold value dth for all the directions (step S104).

For a direction in which Δd is smaller than the predetermined threshold value dth (step S104: Yes), the image forming unit 149 visualizes the distance d [t] at the time t based on a normal method (step S105). For example, the distance d [t] is drawn with a black dot on a white background for the directions θ and φ.

When Δd is equal to or greater than the predetermined threshold value dth (step S104: No), the image forming unit 149 visualizes the distance d [t] at the time t based on a method different from the normal method (step S106). For example, the distance d [t] is drawn with a red circle on the white background for the directions θ and φ.

In this way, the image forming unit 149 forms the image shown in FIG. 17 and outputs the image to the vehicle control unit 103. The image forming unit 149 forms an image in any format such as BMP, PNG, GIF, JPEG, or TIFF.

That is, the image forming unit 149 compares the first measurement data P [t−1] acquired from the LiDAR sensor 120 at the first time t−1 with the second measurement data P [t] acquired from the LiDAR sensor 120 at the second time t after predetermined time has elapsed from the first time t−1, and generates an image in which the second measurement data P [t] having the same direction and a difference in distance being equal to or greater than the threshold value is represented in a mode different from that of the second measurement data P [t] having the same direction and a difference in distance being less than the threshold value.

The vehicle control unit 103 may acquire an image from the image forming unit 149 and may display the image on a display provided in a vehicle interior.

In this way, according to the LiDAR sensor unit 110 in the present embodiment, a measurement point that is different from an immediately preceding situation is displayed separately from a point that is not changed from the immediately preceding situation. Since the measurement point different from the immediately preceding situation can be instantly grasped, the vehicle control unit 103 can instantly grasp the point different from the immediately preceding situation and can quickly perform a necessary operation. For example, in the present embodiment, the vehicle control unit 103 can instantly grasp the appearance of the pedestrian different from the immediately preceding situation, and can stop the vehicle 101.

The image forming unit 149 may be integrated with the signal processing unit 147 or may be separated from the signal processing unit 147. The image forming unit 149 may be provided in a middle of a communication path between the signal processing unit 147 and the vehicle control unit 103.

Fourth Embodiment

Since a LiDAR sensor can acquire information on surroundings of a vehicle, it is conceivable to use the LiDAR sensor as a security sensor configured to monitor a suspicious person trying to open a door while the vehicle is parked. However, a viewpoint is present that a LiDAR consumes a large amount of power and is difficult to be used as a security sensor.

Therefore, a fourth embodiment of the present invention provides a power saving vehicle security system using the LiDAR sensor.

Figure 18:
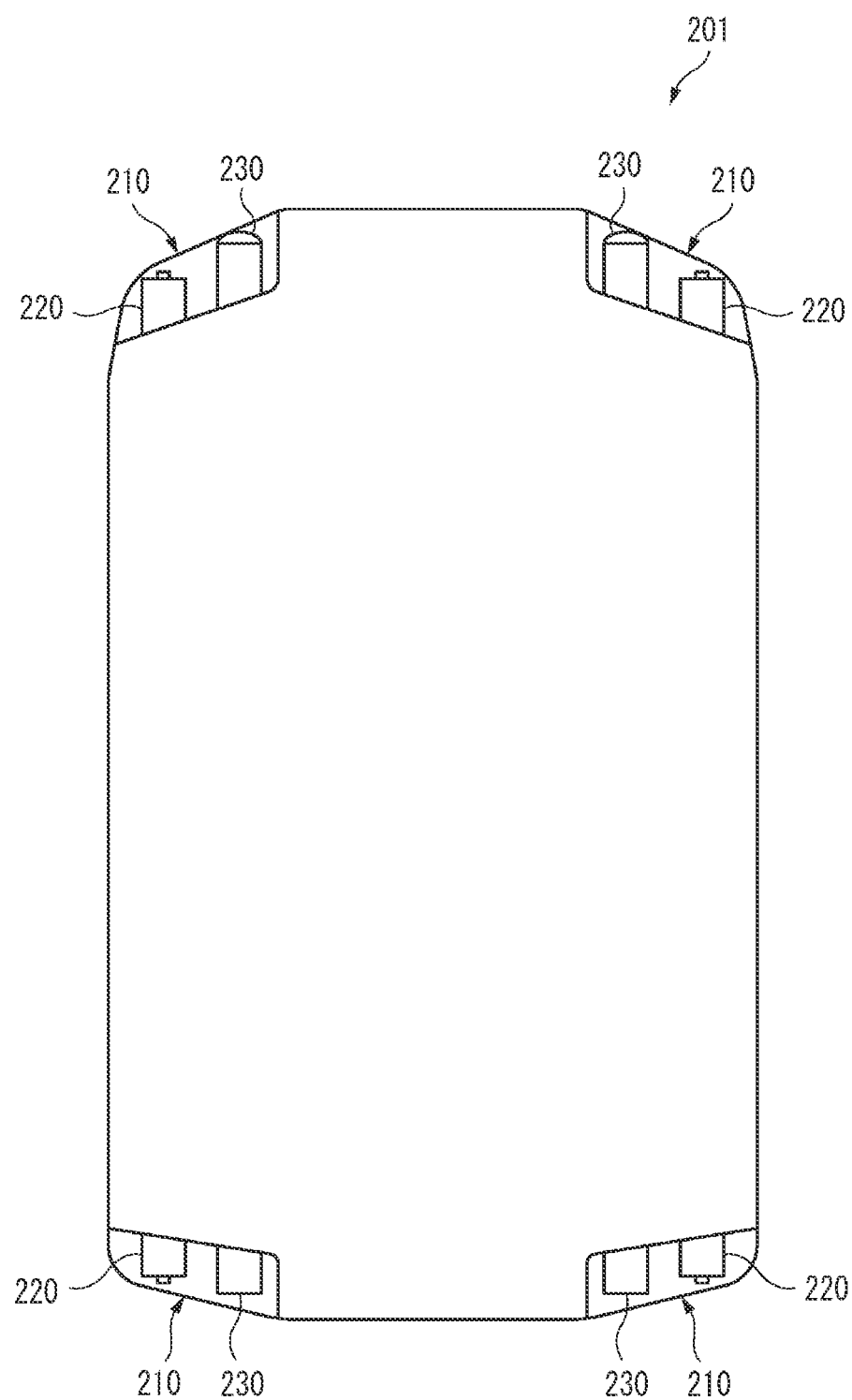
FIG. 18 is a top view showing a vehicle to which a vehicle security system is attached.

FIG. 18 is a top view showing the vehicle 1 to which a vehicle security system 202 according to the present embodiment is attached. The vehicle security system 202 includes a plurality of LiDAR sensor units 210. As shown in FIG. 18, the LiDAR sensor unit 210 is attached to a right front portion, a left front portion, a right rear portion, and a left rear portion of the vehicle 1.

Since the LiDAR sensor unit 210 used in the present embodiment is the same as the LiDAR sensor unit 10 described with reference to FIGS. 2 and 3 in the above-described first embodiment, the description thereof will be omitted.

Figure 19:
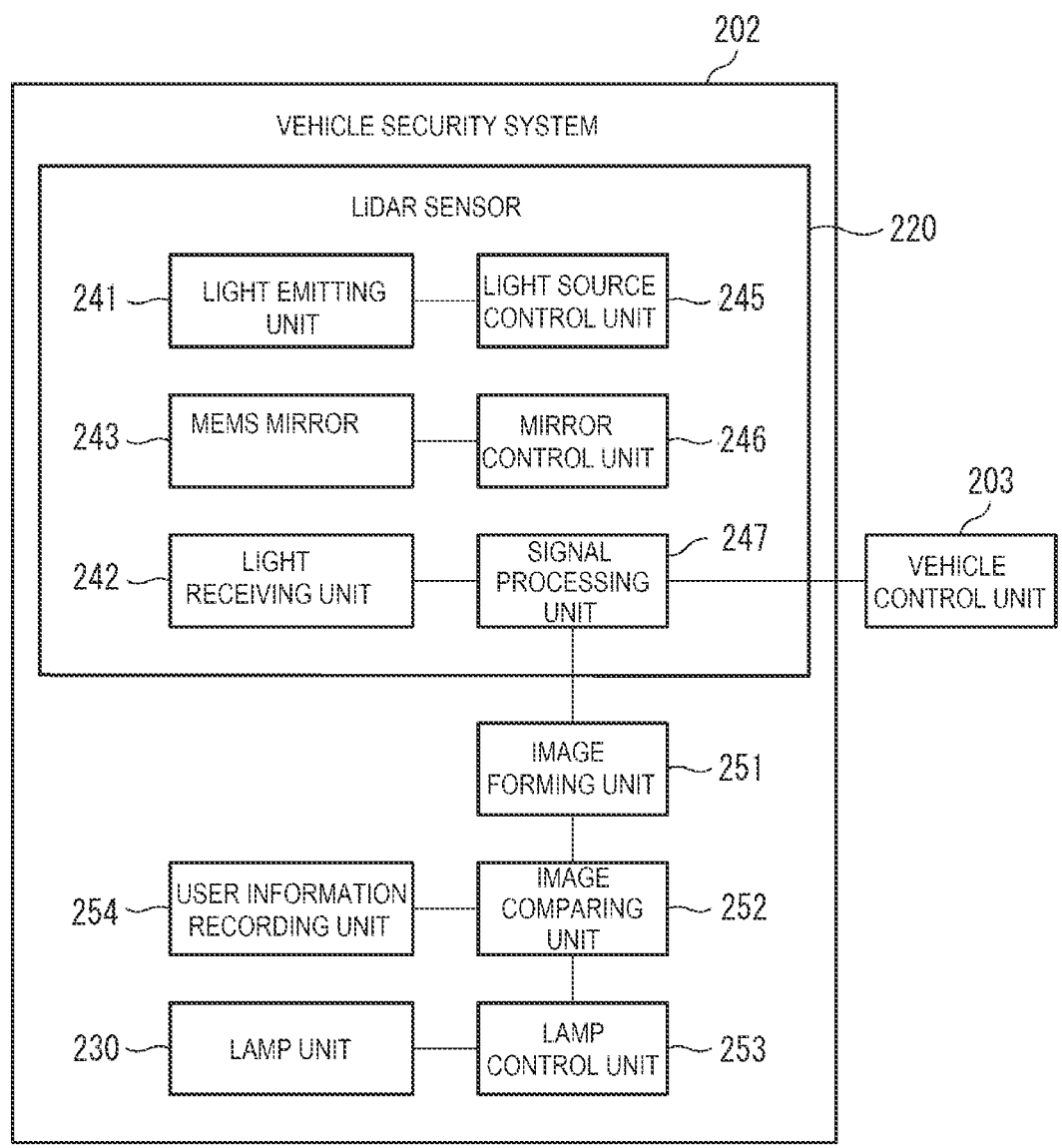
FIG. 19 is a block diagram showing the vehicle security system.

FIG. 19 is a block diagram showing the vehicle security system 202. As shown in FIG. 19, the vehicle security system 202 includes a LiDAR sensor unit 210, a lamp unit 230, an image forming unit 251, an image comparing unit 252, and a lamp control unit 253 (a control unit). As shown in FIG. 19, the LiDAR sensor unit 210 includes a light emitting unit 241, a light source control unit 245, a MEMS mirror 243, a mirror control unit 246, a light receiving unit 242, and a signal processing unit 247. The light source control unit 245 is configured to control an operation of the light emitting unit 241. The mirror control unit 246 is configured to control an operation of the MEMS mirror 243. The lamp control unit 253 is configured to control turning on and off of the lamp unit 230. The signal processing unit 247 is configured to process a signal output from the light receiving unit 242 and to output the processed signal to the vehicle control unit 203. The vehicle control unit 203 is configured to control an operation of a vehicle 201.

Figure 20:
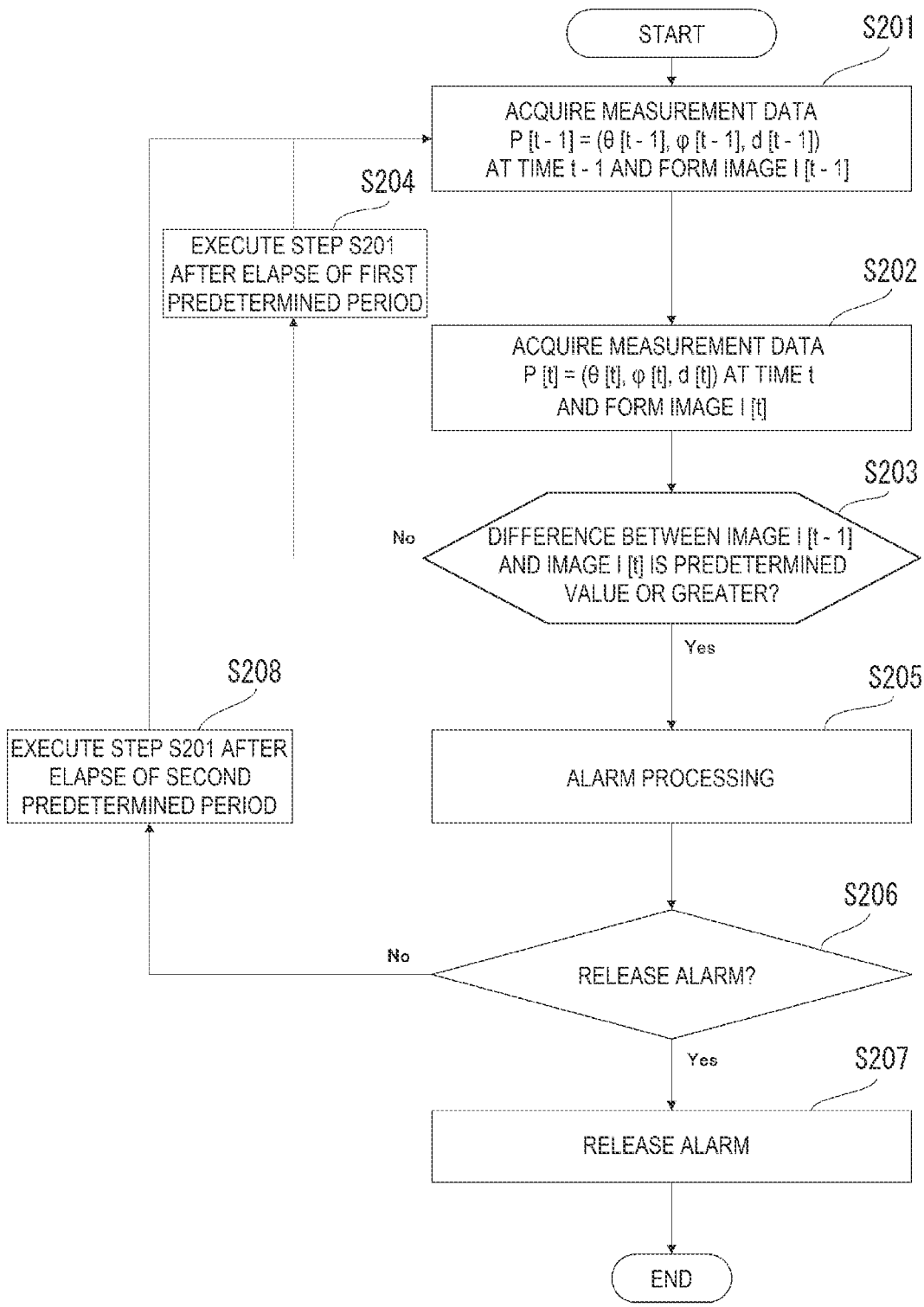
FIG. 20 is a flowchart showing processing executed by the vehicle security system.
Figure 21:
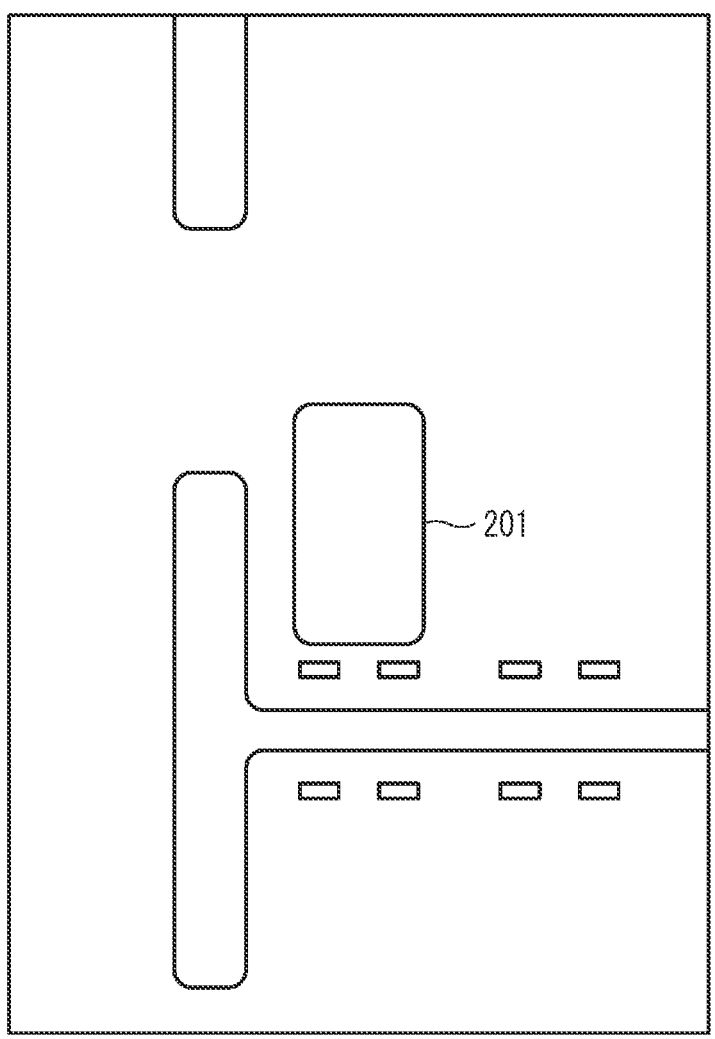
FIG. 21 shows a state of surroundings of the parked vehicle at the time t−1.
Figure 22:
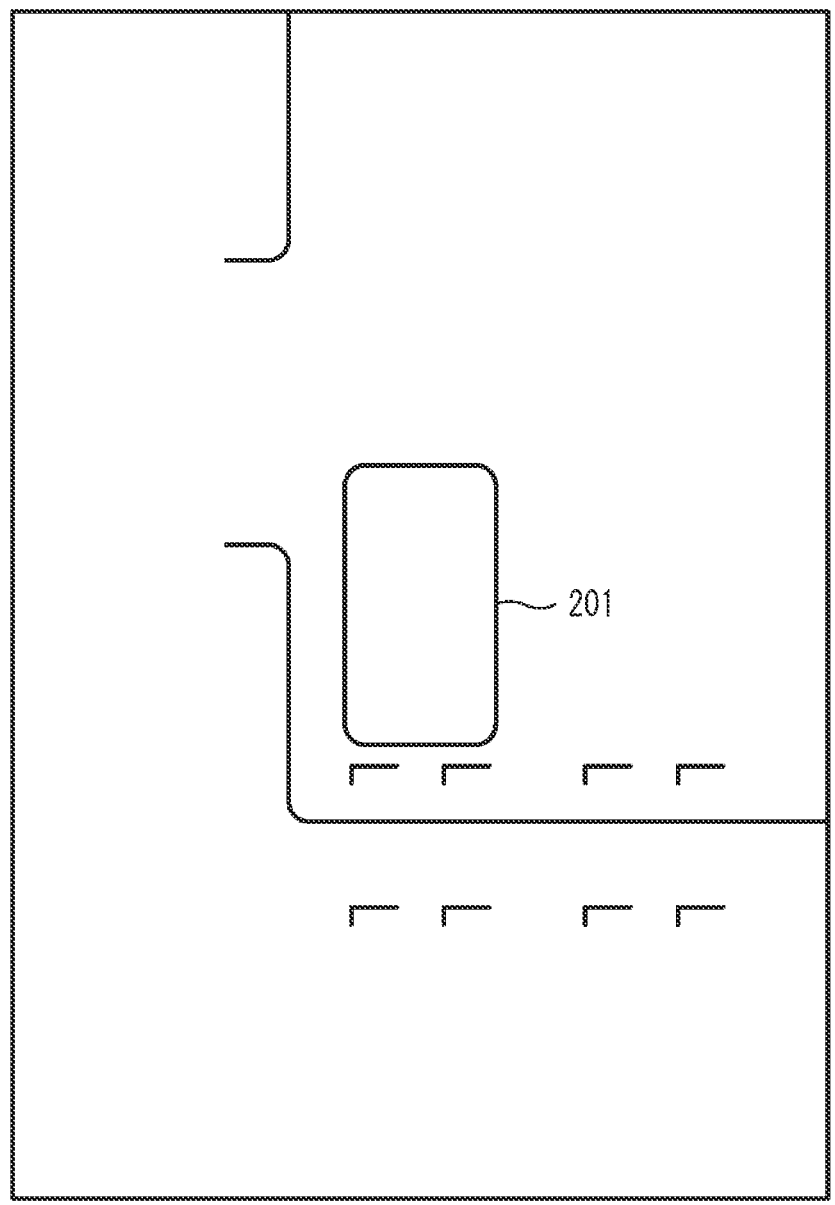
FIG. 22 shows an image formed by the image forming unit in the state shown in FIG. 21.

FIG. 20 is a flowchart showing processing executed by the vehicle security system 202. FIG. 21 shows a state of surroundings of the parked vehicle 201 at the time t−1 before predetermined time from the certain time t. At the time t−1, the vehicle 201 is parked in a parking lot. FIG. 22 is an image I [t−1] formed by the image forming unit 251 based on measurement data acquired by the LiDAR sensor 220 in the state shown in FIG. 21.

At the time t−1, the LiDAR sensor 220 measures a distance for all measurement points. The image forming unit 251 acquires the measurement data P [t−1]=(θ [t−1], φ [t−1], d [t−1]) at the time t−1, and forms the image I [t−1] shown in FIG. 22 (step S201).

Figure 23:
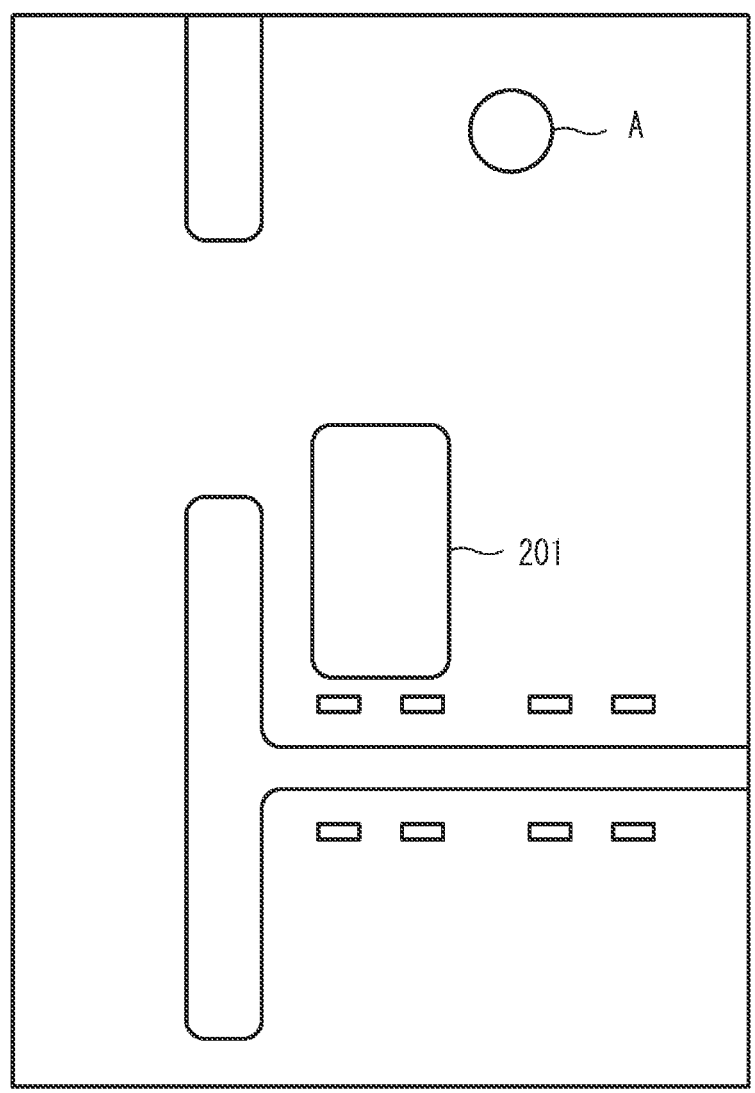
FIG. 23 shows a state of surroundings of the parked vehicle at the time t.
Figure 24:
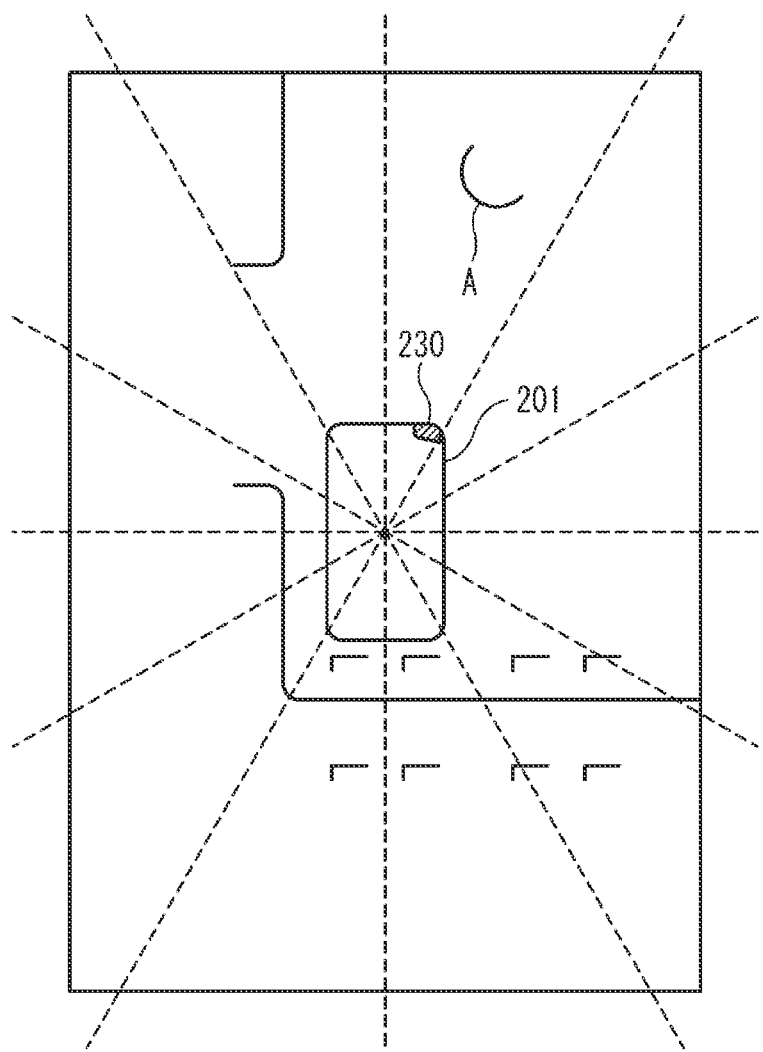
FIG. 24 shows an image formed by the image forming unit in the state shown in FIG. 23.

FIG. 23 shows a state of surroundings of the parked vehicle 201 at the time t. At the time t, a pedestrian A approaches the parked vehicle 201 from upper right in FIG. 23. FIG. 24 is an image I [t] formed by the image forming unit 251 based on measurement data acquired by the LiDAR sensor 220 in the state shown in FIG. 23.

At the time t, the LiDAR sensor 220 measures a distance for all the measurement points. The image forming unit 251 acquires the measurement data P [t]=(θ [t], φ [t], d [t]) at the time t, and forms the image I [t] shown in FIG. 24 (step S202).

The image comparing unit 252 compares the image I [t−1] acquired at the time t−1 with the image I [t] acquired at the time t. The image comparing unit 252 determines whether a difference equal to or greater than a predetermined value is generated between the two images I [t−1] and I [t] (step S203). For example, when the number of pixels having a difference between the two images [t−1] and I [t] is equal to or greater than a predetermined value, the image comparing unit 252 determines that the difference equal to or greater than the predetermined value is generated. For example, when the number of pixels having a difference is 3% or more with respect to the total number of pixels constituting the image, the image comparing unit 252 determines that the difference equal to or greater than the predetermined value is generated between the two images I [t−1] and I [t]. A ratio of the number of pixels having a difference to all the pixels to be set to a threshold value may be changed stepwisely by a user, such as 5% or 10%.

When no difference equal to or greater than the predetermined value is present between the two images I [t−1] and I [t] (step S203: No), the vehicle security system 202 executes step S201 again after a first period elapses (step S204).

When the difference equal to or greater than the predetermined value is generated between the two images I [t−1] and I [t] (step S203: Yes), the image comparing unit 252 performs alarm processing (step S205).

In the present embodiment, the image comparing unit 252 performs the following alarm processing. First, the image comparing unit 252 identifies in which direction the difference is generated when viewed from the host vehicle 201. Further, the image comparing unit 252 outputs the identified direction to the light source control unit 245 and the mirror control unit 246 of the LiDAR sensor 220. In the shown example, the direction to be identified is only an upper right position direction of the host vehicle 201. However, when the difference is generated in a plurality of directions, the plurality of directions may be specified and output to the LiDAR sensor 220. Further, the lamp control unit turns on the lamp unit 230 so as to illuminate the identified direction.

The image comparison unit 252 may output a signal notifying an abnormality to a mobile phone owned by the user.

Further, the image comparing unit 252 determines whether an alarm release signal has been acquired (step S206). For example, the image comparing unit 252 is able to acquire a predetermined alarm release signal from the vehicle control unit 203 or the mobile phone of the user.

When the image comparing unit 252 acquires the alarm release signal within a predetermined period (step S206: Yes), the image comparing unit 252 releases the alarm (step S207) and ends the processing.

When the image comparison unit 252 does not acquire the alarm release signal within the predetermined period (step S206: No), the vehicle security system 202 executes step S201 after a second predetermined period elapses (step S208). Here, the second predetermined period is set to be shorter than the first predetermined period. For example, the first predetermined period is 30 seconds, and the second predetermined period is 0.5 seconds. Alternatively, the first predetermined period is 60 seconds, and the second predetermined period is one second. That is, the vehicle security system 202 repeats steps S201 to S203 at a cycle of approximately 30 seconds.

Measurement data acquired at a first predetermined time interval is referred to as first measurement data. Measurement data acquired at a second predetermined time interval is referred to as second measurement data. In other words, in the above-described embodiment, the second measurement data is acquired in the second period shorter than the first period when a fluctuation greater than the predetermined value occurs during the measurement of the first measurement data.

Since the LiDAR sensor 220 can acquire a shape of the object with high accuracy, the LiDAR sensor 220 is suitable for a security system. In many cases, the LiDAR sensor 220 is mounted on the vehicle 201 that can be automatically driven. The LiDAR sensor 220 mounted on the vehicle 201 that can be automatically driven operates while the vehicle 201 travels, but is not used while the vehicle 201 is parked. The vehicle security system 202 using the LiDAR sensor 220 can use the LiDAR sensor 220 that is not used while the vehicle 201 is parked, and it is not necessary to use a separate sensor only for the vehicle security system, which is rational.

Further, a vehicle security sensor 2 according to the present embodiment is configured to acquire the second measurement data in the second cycle shorter than the first cycle when the fluctuation greater than the predetermined value occurs during the measurement of the first measurement data. That is, in a normal state, the LiDAR sensor 220 is operated in the first cycle so as to reduce power consumption, and in a case in which any state changes and an abnormality is suspected, the LiDAR sensor 220 can be operated in the second cycle to perform investigating in detail. Accordingly, it is possible to acquire highly accurate information when necessary while power consumption is reduced.

In the present embodiment, the light source control unit 245 of the vehicle security system 202 may operate the LiDAR sensor 220 while the vehicle 201 is parked at a resolution lower than a resolution of sensing performed at a time of traveling, or may operate the LiDAR sensor 220 while the vehicle 201 is parked at a cycle longer than a cycle of the sensing performed at the time of traveling.

When the LiDAR sensor 220 is used for security purposes while the vehicle 201 is parked, a resolution lower than the resolution (the number of measurement points) required at the time of traveling is sufficient. When the LiDAR sensor 220 is used for the security purposes while the vehicle 201 is parked, a cycle longer than a cycle (a scan cycle) obtained at the time of traveling is sufficient. By operating the LiDAR sensor 220 with a low resolution or a long cycle, the power consumed by the LiDAR sensor 220 can be reduced.

When the image comparison unit 252 specifies the direction in which the difference is generated in the present embodiment, the image comparing unit 252 divides the image I [t] acquired at the time t into 12 regions in a circumferential direction around the host vehicle 201, and specifies the divided regions. Instead of specifying the direction, the image comparing unit 252 may specify which region the pixel having the difference belongs to, and may output the region to which the pixel belongs to the lamp control unit 253. In this case, the lamp control unit 253 may turn on the lamp unit 230 capable of emitting light toward the input region.

In the above-described embodiment, the alarm processing is performed immediately when the difference equal to or greater than the predetermined value is generated between the image [t-1] and the image I [t]. However, when the difference equal to or greater than the predetermined value is generated, it may be determined whether the difference matches, for example, a pattern registered as an action pattern of a suspicious person, and the alarm processing may be performed when the difference matches the pattern.

The alarm processing may be a known method of notifying an owner of the vehicle 201 such as emitting light and emitting a sound.

In the present embodiment, the vehicle security system 202 may be capable of identifying the owner of the vehicle 201 or a registered person (referred to as a user) as an unregistered person. The vehicle security system 202 may include a user information recording unit 254. The user information recording unit 254 records a specific shape associated with the user. After determining that a difference is present between the image I [t-1] at the time t-1 and the image I [t] at the time t, the image comparing unit 252 determines whether the difference in the image I [t] at the time t matches the shape recorded in the user information recording unit 254. If the difference matches the shape, the lamp control unit 253 turns on the lamp unit 230 based on a method different from that in a case in which the difference does not match the shape.

For example, if the difference matches the shape recorded in the user information recording portion 254, the lamp unit 230 may be constantly on toward the corresponding direction, and if the difference does not match the shape recorded in the user information recording portion 254, the lamp unit 230 may be blinked toward the corresponding region. For example, the user information recording unit 254 can record a shape of a face of the user, a shape of a key holder owned by the user, and the like.

The lamp control unit 253 differentiating a lighting mode of the lamp unit 230 depending on whether the shapes match or do not match includes differentiating lighting and blinking of the lamp unit 230, differentiating blinking of the lamp unit 230, differentiating lighting colors of the lamp unit 230, and differentiating brightness of the lamp unit 230. When the lamp unit 230 includes a plurality of light sources, changing the lighting mode of the lamp unit 230 includes changing the number and a shape of the light sources to be turned on.

The image forming unit 251, the image comparing unit 252, and the lamp control unit 253 may be integrated with the signal processing unit 247 or may be separated from the signal processing unit 247. The image forming unit 251, the image comparing unit 252, and the lamp control unit 253 may be provided in a middle of a communication path between the signal processing unit 247 and the vehicle control unit 203.

In the above-described embodiment, when the difference is present between the image at the time t-1 and the image at the time t, the image comparing unit 252 outputs the direction in which the difference is present to the lamp control unit 253, and the lamp control unit 253 emits light toward the corresponding direction. However, the present invention is not limited thereto. In a case in which the LiDAR sensor unit 210 is provided with a directional speaker, when the difference is present between the image at the time t-1 and the image at the time t, the image comparing unit 252 may output the direction in which the difference is present to a sound source control unit, and the sound source control unit may cause the directional speaker to emit a sound toward the corresponding direction.

Further, in the above-described embodiment, the LiDAR sensor 220 provided in the right front portion, the left front portion, the right rear portion, and the left rear portion of the vehicle 201 has been described. However, the present invention can be applied to all the LiDAR sensors 220 regardless of a mounting position of the vehicle 201.

Further, in the above-described embodiment, an example has been described in which the LiDAR sensor 220 is provided together with the lamp unit 230 inside the outer cover 12 and the housing 11. The outer cover 12 and the housing 11 are common. However, the present invention is not limited thereto. The LiDAR sensor 220 may be provided independently of the lamp unit 230. The LiDAR sensor 220 may be provided inside the outer cover 12 and the housing 11 that are common to other sensors such as a camera and a millimeter wave radar.

The above-described embodiments are merely examples for facilitating an understanding of the present invention. The configurations according to the above-described embodiments can be appropriately modified and improved without departing from the spirit of the present invention.

In the above-described embodiment, the LiDAR sensor unit provided in the right front portion, the left front portion, the right rear portion, and the left rear portion of the vehicle 1 has been described. However, the present invention can be applied to all the LiDAR sensor units regardless of a mounting position of the vehicle.

Further, in the above-described embodiment, an example has been described in which the LiDAR sensor is provided together with the lamp unit inside the outer cover and the housing.

The outer cover and the housing are common. However, the present invention is not limited thereto. The LiDAR sensor may be provided independently of the lamp unit. Alternatively, the LiDAR sensor may be provided inside the outer cover and the housing that are common to other sensors such as a camera and a millimeter wave radar.

The present application is based on a Japanese patent application (Patent Application No. 2019-002788) filed on Jan. 10, 2019, a Japanese patent application (Patent Application No. 2019-002789) filed on Jan. 10, 2019, a Japanese patent application (Patent Application No. 2019-002790) filed on Jan. 10, 2019, and a Japanese patent application (Patent Application No. 2019-002791) filed on Jan. 10, 2019, the contents of which are incorporated herein by reference.

INDUSTRIAL APPLICABILITY

The present invention provides a LiDAR sensor unit in which, even if a lens element is provided, the lens element is less likely to affect measurement data.

REFERENCE SIGNS LIST 1 vehicle
3 vehicle control unit
10 LiDAR sensor unit
11 housing
12 outer cover (lens element)
20 LiDAR sensor
30 lamp unit
41 light emitting unit
42 light receiving unit
43 MEMS mirror
44 converging lens
45 light source control unit
46 mirror control unit
47 signal processing unit (processing unit)
48 memory (recording unit)
101 vehicle
103 vehicle control unit
110 LiDAR sensor unit
111 housing
112 outer cover
120 LiDAR sensor
141 light emitting unit
142 light receiving unit
143 MEMS mirror
144 converging lens
145 light source control unit
146 mirror control unit
147 signal processing unit (processing unit)
148 memory
149 image forming unit
201 vehicle
202 vehicle security system
203 vehicle control unit
210 LiDAR sensor unit
220 LiDAR sensor
230 lamp unit (light source)
241 light emitting unit
242 light receiving unit
243 MEMS mirror
244 converging lens
245 light source control unit
246 mirror control unit
247 signal processing unit
251 image forming unit
252 image comparing unit
253 lamp control unit (control unit)
254 user information recording unit
S standard screen
$\theta$ direction angle
$\varphi$ elevation angle
d distance
dmax maximum value
dmin minimum value
dmean average value
dth fluctuation threshold value
$\Delta$d difference
dth threshold value
$\Delta$d fluctuation
A pedestrian

The invention claimed is:

1. A LiDAR sensor unit comprising:
a LiDAR sensor;
a lens element that is provided on an optical path of light emitted from the LiDAR sensor; and
a processing unit configured to output measurement data including a direction and a distance that are to be measured, the measurement data being measured by the LiDAR sensor,
wherein the processing unit is configured not to output the measurement data for a specific direction in which the direction is the same and distances are different before and after attachment of the lens element in the same environment.

2. The LiDAR sensor unit according to claim 1,
wherein the specific direction in which the direction is the same and distances are different before and after attachment of the lens element in the same environment is recorded in a rewritable recording unit.

3. A LiDAR sensor unit comprising:
a LiDAR sensor;
a lens element that is provided on an optical path of light emitted from the LiDAR sensor; and
a processing unit configured to output measurement data including a direction and a distance that are to be measured, the measurement data being measured by the LiDAR sensor,
wherein the processing unit does not cause the LiDAR sensor to emit detection light in a specific direction in which the direction is the same and distances are different before and after attachment of the lens element in the same environment.

4. A LiDAR sensor unit comprising:
a LiDAR sensor;
a lens element that is provided on an optical path of light emitted from the LiDAR sensor;
a processing unit configured to output measurement data including a direction and a distance that are to be measured, the measurement data being measured by the LiDAR sensor; and
a recording unit configured to record a specific direction in which the direction is the same and distances are different before and after attachment of the lens element in the same environment.

* * * * *